United States Patent
Cai et al.

(10) Patent No.: US 12,534,454 B2
(45) Date of Patent: Jan. 27, 2026

(54) CRYSTAL FORMS OF 5-FLUORO-1-(4-FLUORO-3-(4-(PYRIMIDIN-2-YL)PIPERAZINE-1-CARBONYL)BENZYL)QUINAZOLINE-2,4(1H,3H)-DIONE AND PREPARATION THEREOF

(71) Applicant: IMPACT THERAPEUTICS (SHANGHAI), INC, Shanghai (CN)

(72) Inventors: Sui Xiong Cai, Shanghai (CN); Ning Ma, Jiangsu (CN); Yisheng Yang, Shanghai (CN); Kai Yang, Shanghai (CN)

(73) Assignee: Impact Therapeutics (Shanghai), Inc, Shanghai (CN)

( * ) Notice: Subject to any disclaimer, the term of this patent is extended or adjusted under 35 U.S.C. 154(b) by 433 days.

(21) Appl. No.: 18/252,423

(22) PCT Filed: Nov. 9, 2021

(86) PCT No.: PCT/CN2021/129581
§ 371 (c)(1),
(2) Date: May 10, 2023

(87) PCT Pub. No.: WO2022/100577
PCT Pub. Date: May 19, 2022

(65) Prior Publication Data
US 2023/0399316 A1    Dec. 14, 2023

(30) Foreign Application Priority Data
Nov. 10, 2020    (WO) ................ PCT/CN2020/127733

(51) Int. Cl.
*C07D 403/12*    (2006.01)

(52) U.S. Cl.
CPC ........ *C07D 403/12* (2013.01); *C07B 2200/13* (2013.01)

(58) Field of Classification Search
None
See application file for complete search history.

(56) References Cited

U.S. PATENT DOCUMENTS 10,562,889 B2    2/2020    Cai et al.
11,179,392 B2 *  11/2021   Cai .......................... A61P 43/00

FOREIGN PATENT DOCUMENTS

| WO | WO-2012130166 A1 | 10/2012 |
| WO | WO-2016155655 A1 | 10/2016 |
| WO | WO-2017167251 A1 | 10/2017 |

OTHER PUBLICATIONS

Caira, M.R., "Crystalline Polymorphism of Organic Compounds," in *Topics in Current Chemistry*, pp. 163-208, Springer Science+Business Media, Berlin, Germany (1998).
International Search Report and Written Opinion for International Application No. PCT/CN2021/129581, mailed Feb. 10, 2022, International Searching Authority, National Intellectual Property Administration, China, 9 pages.
Krishnakumar, R., et al., "The PARP side of the nucleus: molecular actions, physiological outcomes, and clinical targets," Mol. Cell. 39(1):8-24, Cell Press, United States (2010).

* cited by examiner

*Primary Examiner* — Jeffrey S Lundgren
*Assistant Examiner* — Anthony Joseph Seitz
(74) *Attorney, Agent, or Firm* — Sterne, Kessler, Goldstein & Fox P.L.L.C.

(57) ABSTRACT

Provide crystal forms of 5-fluoro-1-(4-fluoro-3-(4-(pyrimidin-2-yl) piperazine-1-carbonyl) benzyl) quinazoline-2, 4 (1H,3H)-dione and preparation method thereof.

16 Claims, 18 Drawing Sheets

CRYSTAL FORMS OF 5-FLUORO-1-(4-FLUORO-3-(4-(PYRIMIDIN-2-YL)PIPERAZINE-1-CARBONYL)BENZYL) QUINAZOLINE-2,4(1H,3H)-DIONE AND PREPARATION THEREOF

TECHNICAL FIELD

The present disclosure relates to crystal forms of 5-fluoro-1-(4-fluoro-3-(4-(pyrimidin-2-yl)piperazine-1-carbonyl) benzyl)quinazoline-2,4(1H,3H)-dione and preparation thereof.

BACKGROUND

Poly(ADP-ribose) polymerase (PARP) catalyzes the addition of poly(ADP-ribose) to the target protein molecule using NAD+, which is an important process in DNA repair. This is an essential process for maintaining DNA and chromosome integrity and stability, and for ensuring the survival of mammalian cells. PARP-1 catalyzes most of the intracellular ADP-ribose polymerization reactions, although PARP-2 and other subtypes also have this function. PARP-1 knockout mice do not have the repair function for single-stranded DNA damage (Krishnakumar R and Kraus W L, *Mol Cell*, 2010, 39(1): 8-24). At the same time, cancer cells with DNA repair defects, such as BRCA1 (breast cancer 1) or BRCA2 (breast cancer 2) deficiency, are particularly sensitive to PARP inhibitors. Several PARP inhibitors, including Olaparib, have been approved for the treatment of BRCA-mutated ovarian cancers, breast cancers, prostate cancers, and pancreatic cancers. It has been demonstrated that PARP inhibitors can be used as anti-cancer drugs to effectively treat a variety of cancers.

The applications of PARP inhibitors for the treatment of cancers are mainly based on two mechanisms. First, due to the rapid growth, the DNA replication of cancer cells is much higher than that of normal cells. Therefore, drugs that can cause DNA damage will induce the death of cancer cells selectively. However, due to the existence of DNA repair enzymes such as PARP, the therapeutic effects of these drugs cannot be fully utilized. Therefore, when PARP inhibitors are used in combination with commonly used DNA damage chemotherapeutic anticancer drugs, they can produce a synergistic effect due to their inhibition of DNA repair, thereby greatly enhancing the efficacy of DNA damage anticancer drugs such as Temozolamide (TMZ). Second, for cancer cells with DNA repair defects, such as BRCA1 or BRCA2 deleted triple-negative breast cancer and so on, PARP inhibitors can independently act as anticancer drugs to kill these cells directly (Synthetic Lethality).

WO2012130166A1 and WO2017167251 disclosed the preparation methods of 5-fluoro-1-(4-fluoro-3-(4-(pyrimidin-2-yl)piperazine-1-carbonyl)benzyl)quinazoline-2,4(1H,3H)-dione.

There is still apparent need for alternative or improved synthetic preparation methods, especially for large-scale, environmentally friendly production. In addition, it is desirable to obtain a physically stable form of 5-fluoro-1-(4-fluoro-3-(4-(pyrimidin-2-yl)piperazine-1-carbonyl)benzyl)quinazoline-2,4(1H,3H)-dione suitable for the manufacture process.

SUMMARY

The present disclosure provides crystal forms of 5-fluoro-1-(4-fluoro-3-(4-(pyrimidin-2-yl)piperazine-1-carbonyl)benzyl)quinazoline-2,4(1H,3H)-dione.

In one or more embodiments, the present disclosure provides crystal forms I, II, III, V, VI, IX, X, XI, VIII, XII and "VIII" of 5-fluoro-1-(4-fluoro-3-(4-(pyrimidin-2-yl) piperazine-1-carbonyl)benzyl)quinazoline-2,4 (1H,3H)-dione, or a mixture of two or more of the above crystal forms, such as a mixture of I and II, a mixture of I and XI, a mixture of II and IX, etc.

The present disclosure also provides the use of crystal forms I, II, III, V, VI, IX, X, XI, VIII, XII or "VIII" of 5-fluoro-1-(4-fluoro-3-(4-(pyrimidin-2-yl)piperazine-1-carbonyl)benzyl)quinazoline-2,4 (1H,3H)-dione, or a mixture of two or more of the above crystal forms, such as a mixture of I and II, a mixture of I and XI, a mixture of II and IX, etc. in the manufacture of a medicament for treatment or prevention of clinical conditions responsive to the inhibition of PARP activity, especially the cancers described herein.

The present disclosure also provides a preparation method of crystal form VIII of 5-fluoro-1-(4-fluoro-3-(4-(pyrimidin-2-yl)piperazine-1-carbonyl)benzyl) quinazoline-2,4(1H,3H)-dione as well as preparation methods of other crystal forms I, II, III, V, VI, IX, X, XI, XII and "VIII".

The present disclosure also provides a method for preparing a drug, which includes the step of mixing the crystal form VIII and a pharmaceutically acceptable carrier or excipient. Preferably, the method comprises a step of tableting or granulating the obtained mixture.

DETAILED DESCRIPTION

I. General Description

Figure 1:
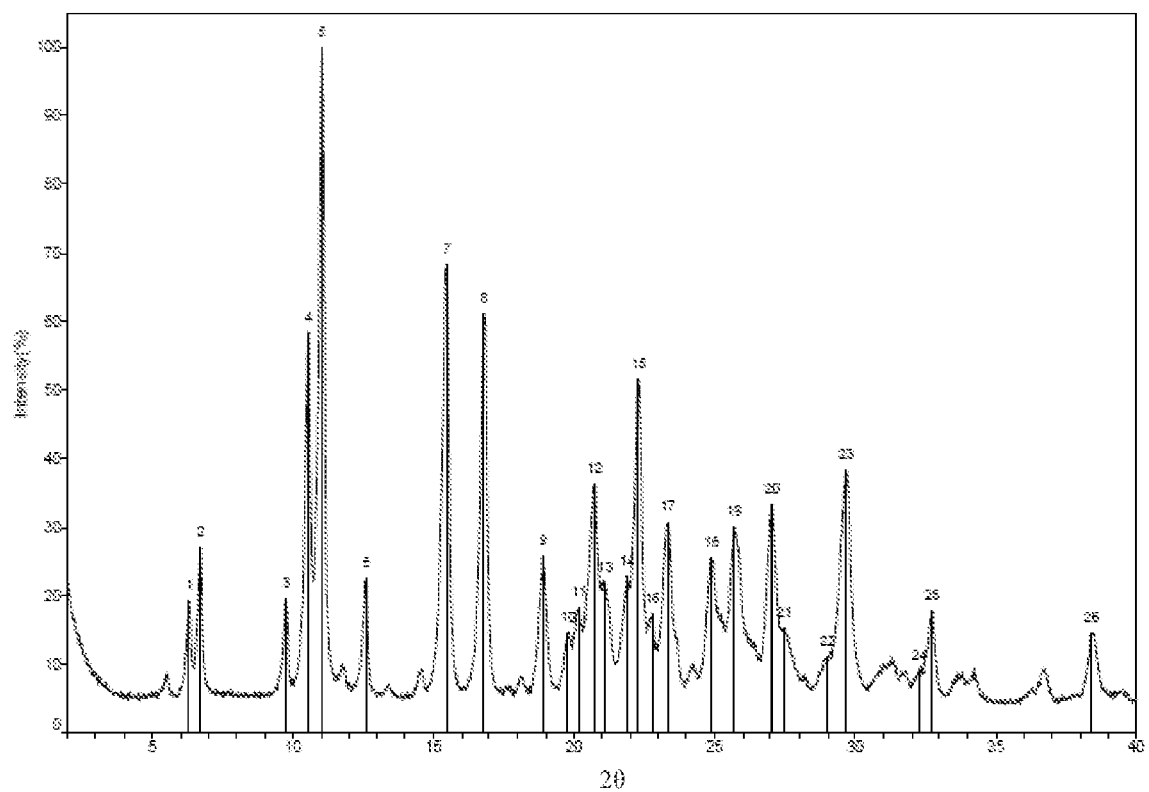
FIG. 1 shows XRPD of the crystal form VIII.

In the following description, a certain amount of specific details are set forth in order to provide a thorough understanding of various embodiments of the present disclosure. However, those skilled in the art will understand that the present disclosure can be practiced without these details. The following description of several embodiments is based on the understanding that the present disclosure is regarded as an example of the claimed subject matter, and is not intended to limit the appended claims to the specific embodiments shown. The headings used throughout this disclosure are provided for convenience only and should not be construed as limiting the claims in any way. The embodiment shown under any heading can be combined with the embodiment shown under any other heading.

II. Definition

Unless indicated otherwise, throughout the specification and claims, the word "including" and its variants are interpreted in an open and inclusive meaning, that is, "including but not limited to"; at the same time, "including" and its variations such as "comprising" also include "mainly consisting of" and "consisting of".

Reference throughout this specification to "one embodiment" or "an embodiment" means that a specific feature, structure, or characteristic described in conjunction with the embodiment is included in at least one embodiment of the present disclosure. Therefore, the appearances of the phrases "in one embodiment" or "in an embodiment" in various places throughout this specification do not necessarily all refer to the same embodiment. In addition, specific features, structures, or characteristics can be combined in any suitable manner in one or more embodiments.

Embodiments referring to "compounds of Formula I" throughout the specification include crystals, salts, co-crystals, and solvate forms of the formula and/or compounds disclosed herein.

The present disclosure also intends to include all pharmaceutically acceptable compounds of Formula I that are isotopically labeled by substituting one or more atoms with atoms having different atomic masses or mass numbers. Examples of isotopes that can be incorporated into the disclosed compounds include isotopes of hydrogen, carbon, nitrogen, oxygen, phosphorus, fluorine, chlorine, and iodine, such as $^2H$, $^3H$, $^{11}C$, $^{13}C$, $^{14}C$, $^{13}N$, $^{15}N$, $^{15}O$, $^{17}O$, $^{18}O$, $^{31}P$, $^{32}P$, $^{35}S$, $^{18}F$, $^{36}Cl$, $^{123}I$ and $^{125}I$. These radiolabeled compounds can be used to help to determine or measure the effectiveness of the compound, for example, by characterizing the site of action or mode of action, or the binding affinity to a pharmacologically important site of action. Certain isotopically labeled compounds of Formula I, such as those being incorporated with radioisotopes, can be used in drug and/or substrate tissue distribution studies. Considering the ease of incorporation and ready-made detection methods, the radioisotopes tritium (i.e., $^3H$) and carbon-14 (i.e., $^{14}C$) are particularly suitable for this purpose.

Substitution with heavier isotopes such as deuterium (i.e., $^2H$) can provide certain therapeutic advantages due to higher metabolic stability. For example, the in vivo half-life may increase or the dosage requirement may decrease. Therefore, in some cases, heavier isotopes may be preferred.

Replacement with positron emission isotopes (such as $^{11}C$, $^{18}F$, $^{15}O$ and $^{13}N$) can be used in positron emission tomography (PET) studies to check the substrate receptor occupancy. The preparation of isotopically labeled compounds of formula I can generally be carried out by conventional techniques known to those skilled in the art or by methods similar to those described in the examples described below, using appropriate isotopically-labeled reagents instead of previously used unlabeled reagents.

"Pharmaceutically acceptable excipients" include but are not limited to any adjuvants, carriers, excipients, glidants, sweeteners, diluents, preservatives, dyes/colorants, flavor enhancers, surfactants, wetting agents, dispersing agents, suspending agents, stabilizers, isotonic agents, solvents or emulsifiers, which have been approved by the FDA or NMPA or other relevant agencies as acceptable for use in humans or livestock.

"Pharmaceutical composition" refers to a formulation of the compound of the present disclosure and a vehicle generally accepted in the art for the delivery of a biologically active compound to a mammal (such as a human). Such vehicles include all pharmaceutically acceptable excipients for this purpose.

"Effective amount" or "therapeutically effective amount" refers to the amount of the compound according to the present disclosure, which when administered to a patient in need thereof, is sufficient to achieve the treatment of a disease state, condition or disorder for which the compound is useful. Such an amount will be sufficient to elicit the biological or medical response of the tissue system or patient sought by the researcher or clinician. The amount of the compound according to the present disclosure that constitutes a therapeutically effective amount will vary depending on factors such as the compound and its biological activity, composition for administration, time of administration, route of administration, compound excretion rate, duration of treatment, the state of disease to be treated, the type of condition and its severity, the drugs used in combination or consistent with the compound of the present disclosure, and the age, weight, general health, gender, and diet of the patient. Those skilled in the art can routinely determine such a therapeutically effective amount based on their own knowledge, prior arts, and the present disclosure.

Unless otherwise stated, the term "treating" as used herein refers to reversing, reducing, or inhibiting progression of a disorder or condition to which this term applies or one or more symptoms of the disorder or condition, or preventing the disorder or condition or one or more symptoms thereof.

"Preventing" refers to any treatment of a disease or condition that causes the clinical symptoms of the disease or condition not to develop.

The term "subject" or "patient" refers to an animal, such as a mammal (including a human), that has been or will be the subject of treatment, observation, or experiment. The methods described herein can be used in human therapy and/or veterinary applications. In some embodiments, the subject is a mammal (or patient). In some embodiments, the subject (or patient) is a human, domestic animals (such as dogs and cats), farm animals (such as cows, horses, sheep, goats, and pigs), and/or laboratory animals (such as mice, rats, hamsters, guinea pigs, pigs, rabbits, dogs and monkeys). In some embodiments, the subject (or patient) is a human. A "person (or patient) in need" refers to a person who may have or is suspected of having a disease or condition that would benefit from certain treatments; for example, treatment with a compound disclosed herein in accordance with the present application.

"Tautomer" refers to the transfer of a proton from one atom of a molecule to another atom of the same molecule. The present disclosure includes tautomers of any of the compounds.

References herein to "about" a value or parameter include (and describe) implementations for the value or parameter itself. For example, description referring to "about X" includes description of "X". In addition, the singular forms "a" and "the" include plural references unless the context clearly dictates otherwise. Thus, for example, reference to "the compound" includes a plurality of such compounds, and reference to "the assay" includes reference to one or more assays and equivalents thereof known to those skilled in the art.

"Pharmaceutically acceptable" or "physiologically acceptable" refers to compounds, salts, compositions, dosage forms, and other substances that can be used to prepare pharmaceutical compositions suitable for veterinary or human pharmaceutical use.

"Unit dosage form" is a physically discrete unit suitable as a unit dose for subjects (e.g., human subjects and other mammals), each unit containing a predetermined amount of active substance, which is calculated to produce the desired therapeutic effect, together with suitable pharmaceutical excipients.

When referring to, for example, XRPD patterns, DSC thermograms, DVS graphs or TGA, the term "substantially the same as that shown in . . . " includes the patterns, thermograms, or graphs which are not necessarily the same as those described herein, but fall within the limits of experimental error or deviation when considered by the person skilled in the art.

In some embodiments, with regard to the specific crystal form of the compound, the term "substantially pure" or "substantially free of" means that the composition containing the crystal form contains less than 99%, less than 95%, less than 90%, less than 85%, less than 80%, less than 75%, less than 70%, less than 65%, less than 60%, less than 55%, less than 50%, less than 40%, less than 30%, less than 20%, less than 15%, less than 10%, less than 5%, or less than 1% by weight of other substances, including other crystal forms and/or impurities. In some embodiments, "substantially pure" or "substantially free of" refers to materials that are free of other substances (including other crystal forms and/or impurities). For example, impurities may include by-products or remaining reagents from chemical reactions, contaminants, degradation products, other crystal forms, water, and solvents.

In the present disclosure, for the characteristic powder X-ray diffraction peak position of the crystal form, the allowable error of the angular position (2θ) is ±0.2°. This error is used when comparing two powder X-ray diffraction patterns. If a diffraction peak in one image is designated as a certain angular position range of measured peak position ±0.2° (2θ), and a diffraction peak in another image is designated as the other angular position range of measured peak position ±0.2° (2θ), and if these peak ranges overlap, the two peaks are considered to have the same angular position (2θ). For example, if the diffraction peak of an image is determined to be at 5.20°, for comparison, the allowable error allows the peak to be specified in the range of 5.00°-5.40°. If the control peak of the other diffraction pattern is determined to be at 5.35°, for comparison, the allowable error allows the peak to be specified in the range of 5.15°-5.55°. Because of the overlap between the two peak position ranges, the two compared peaks are considered to have the same angular position (2θ). In some embodiments, the allowable error of the angular position (2θ) is ±0.1°.

III. Crystal Forms

The present disclosure provides crystal forms of 5-fluoro-1-(4-fluoro-3-(4-(pyrimidin-2-yl)piperazine-1-carbonyl) benzyl)quinazoline-2,4 (1H,3H)-dione. The crystal forms of the present disclosure have properties suitable for medical or pharmaceutical uses, including but not limited to bioavailability, stability, purity, and/or manufacturability.

Specifically, the present disclosure provides the crystal forms I, II, III, V, VI, VIII, IX, X, XI, XII and "VIII" of 5-fluoro-1-(4-fluoro-3-(4-(pyrimidin-2-yl)piperazine-1-carbonyl)benzyl)quinazoline-2,4 (1H,3H)-dione, or a mixture of two or more of the above crystal forms, for example, a mixture of crystal form I and crystal form II, a mixture of crystal form I and crystal form XI, a mixture of crystal form II and crystal form IX, etc.

Crystal Form VIII

The crystal form of the compound 5-fluoro-1-(4-fluoro-3-(4-(pyrimidin-2-yl)piperazine-1-carbonyl)benzyl)quinazoline-2,4 (1H,3H)-dione of the present disclosure has a X-ray powder diffraction (XRPD) pattern including diffraction peaks (characteristic peaks) at 2θ=6.7°±0.2°, 11.0°±0.2°, 22.2°±0.2° and 25.7°±0.2°. Preferably, the XRPD pattern of the crystal form further includes a diffraction peak at 2θ=27.0°±0.2°. Optionally, the XRPD pattern of the crystal form further includes (a) any one, any two, any three or more than three, or all of diffraction peaks at positions of 10.5°±0.2°, 15.5°±=0.2°, 16.7°±0.2°, 18.9°±0.2°, 20.7°±0.2°, 23.3°±0.2° and 29.7°±0.2°; or (b) any one, any two, any three or more than three, or all of diffraction peaks at positions of 11.7°±0.2°, 16.1°±0.2°, 17.2°±0.2° and 30.0°±0.2°.

In some embodiments, the crystal form of the compound 5-fluoro-1-(4-fluoro-3-(4-(pyrimidin-2-yl)piperazine-1-carbonyl)benzyl)quinazoline-2,4 (1H,3H)-dione is form VIII, and its XRPD pattern includes diffraction peaks at 2θ=6.7°±0.2°, 10.5°±0.2°, 11.0°±0.2°, 15.5°±0.2°, 16.7°±0.2°, 18.9±0.2°, 20.7°±0.2°, 22.2°±0.2°, 23.3°±0.2°, 25.7°±0.2°, 27.0°±0.2° and 29.7°±0.2°. Preferably, the crystal form VIII is dihydrate. More preferably, the KF value of the crystal form VIII is 6%-10%, preferably 6.6%-9%. Preferably, the crystal form VIII has an XRPD pattern substantially the same as that shown in FIG. 1. In some embodiments, the crystal form VIII of the present disclosure has a DSC thermogram substantially the same as that shown in FIG. 2. In some embodiments, the crystal form VIII of the present disclosure has a TGA substantially the same as that shown in FIG. 3. In some embodiments, the crystal form VIII of the present disclosure has a DVS substantially the same as that shown in FIG. 4.

Figure 34:
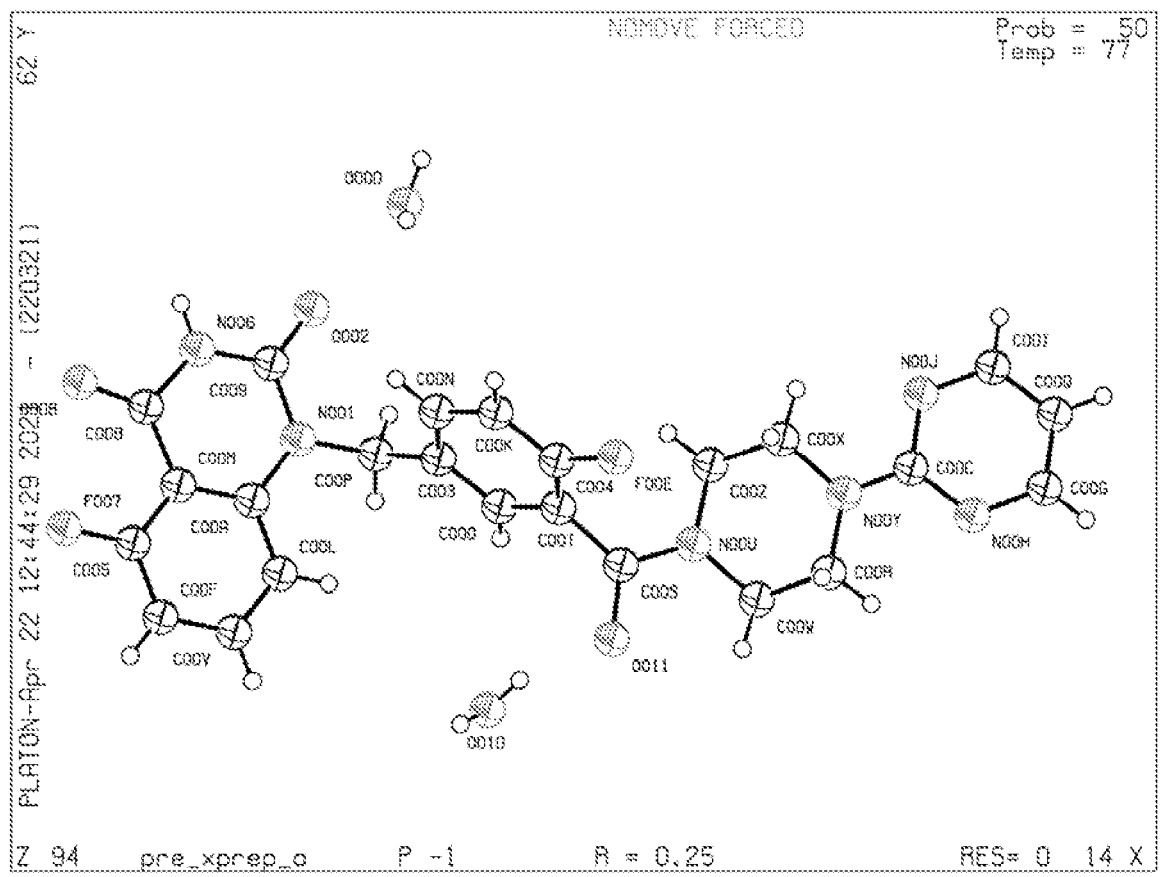
FIG. 34 shows the asymmetric unit of the monocrystal structure of crystal form VIII of Compound I-A.

In the preferred embodiment, the crystal form VIII of the present disclosure has at least one, any two, any three, any four or all five of the following (a) to (e):
  (a) an XRPD pattern substantially the same as that shown in FIG. 1;
  (b) a DSC thermogram substantially the same as that shown in FIG. 2;
  (c) a TGA substantially the same as that shown in FIG. 3;
  (d) a DVS substantially the same as that shown in FIG. 4; and (e) a schematic diagram of asymmetric unit substantially the same as that shown in FIG. 34.

The crystal form VIII is dehydrated under low humidity (30% RH) to produce crystal form "VIII'". The XRPD of the crystal form "VIII'" includes diffraction peaks at 2θ=6.8°±0.2°, 10.9°±0.2°, 11.7°±0.2°, 16.1°±0.2°, 17.2°±0.2°, 22.1°±0.2°, 25.8°±0.2°, 27.2°±0.2° and 30.0°±0.2°. Preferably, the crystal form "VIII'" has an XRPD pattern substantially the same as that shown in FIG. 32.

Under lower humidity conditions, such as <30% RH, or 0% RH, the crystal form VIII is dehydrated to obtain the crystal form XII.

Under certain humidity conditions, crystal form "VIII'" and crystal form XII will gradually transform into crystal form VIII.

Crystal Form I

The XRPD pattern of crystal form I provided by the present disclosure includes diffraction peaks (characteristic peaks) at 2θ=5.2°±0.2°, 6.6°±0.2°, 13.3°±0.2°, and 19.9°±0.2°. Preferably, the crystal form I has an XRPD pattern substantially the same as that shown in FIG. 5.

Figure 6:
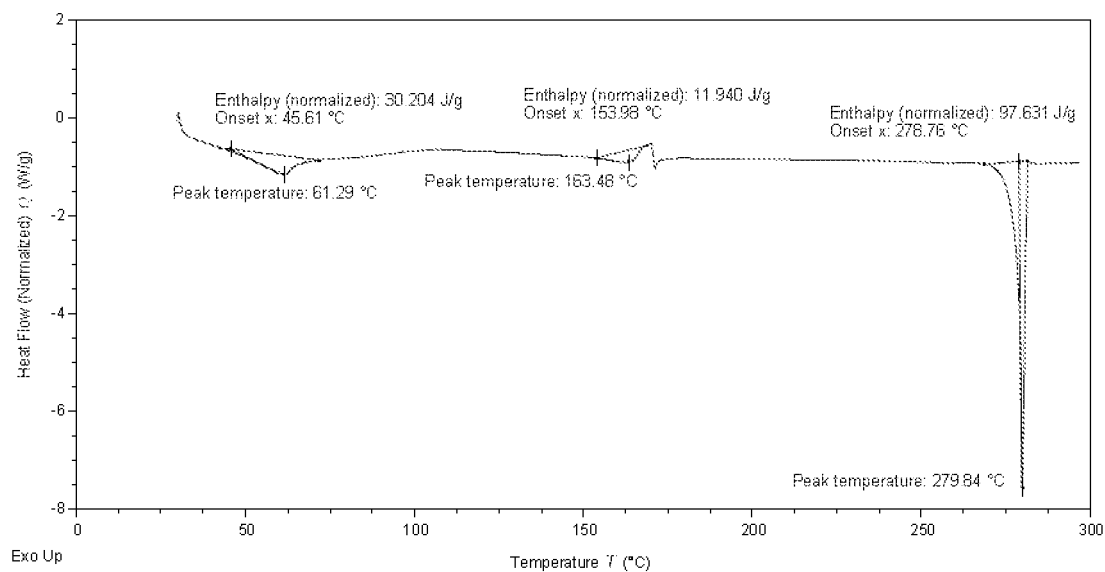
FIG. 6 shows DSC of the crystal form I.

The crystal form I of the present disclosure may have a DSC thermogram substantially the same as that shown in FIG. 6.

Figure 7:
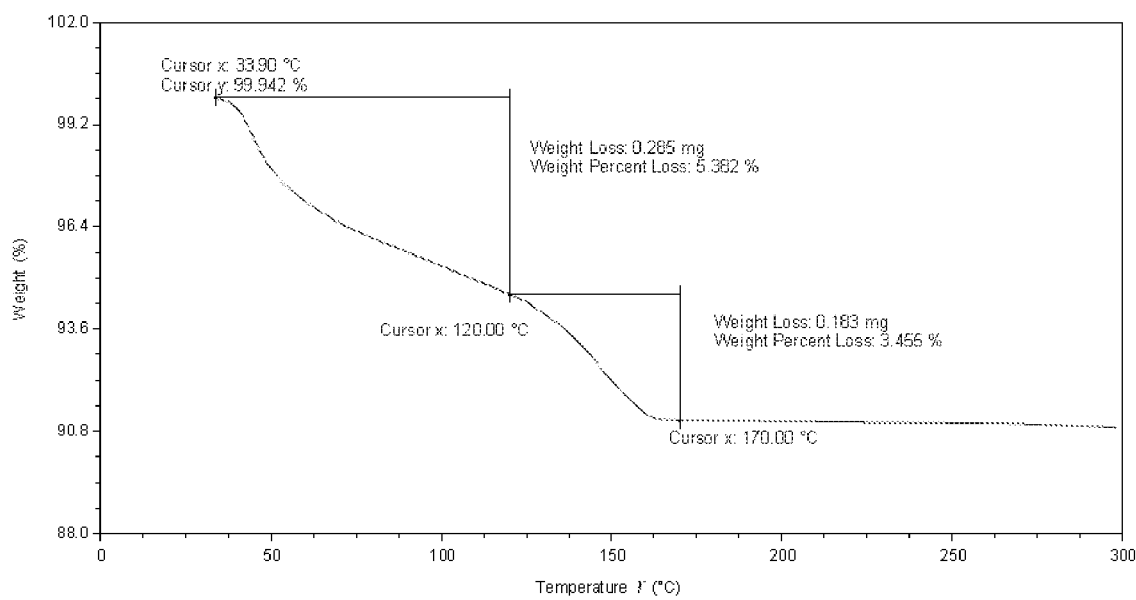
FIG. 7 shows TGA of the crystal form I.

The crystal form I of the present disclosure may have a TGA substantially the same as that shown in FIG. 7.

In some embodiments, the crystal form I of the present disclosure has at least one, any two or all three of the following (a) to (c):
(a) an XRPD pattern substantially the same as that shown in FIG. 5;
(b) a DSC thermogram substantially the same as that shown in FIG. 6; and
(c) a TGA substantially the same as that shown in FIG. 7.

Crystal Form II

The XRPD pattern of crystal form II provided by the present disclosure includes diffraction peaks at 2θ=10.6°±0.2°, 11.0°±0.2°, 15.5°±0.2° and 16.8°±0.2°. Preferably, the XRPD pattern of the crystal form II further includes a diffraction peak at 2θ=20.8°±0.2°. Preferably, the crystal form II has an XRPD pattern substantially the same as that shown in FIG. 8.

Figure 9:
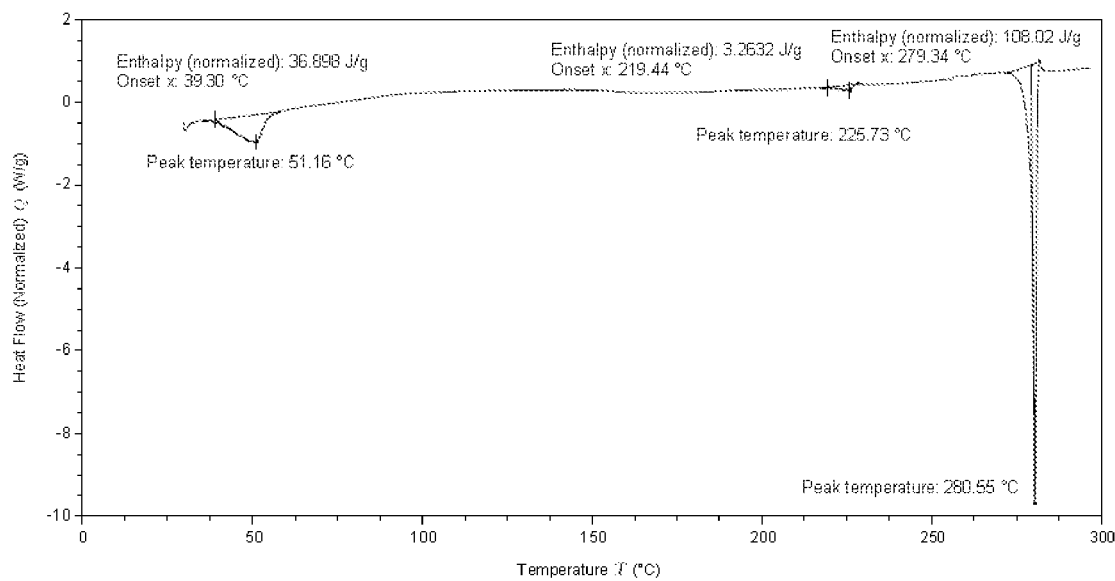
FIG. 9 shows DSC of the crystal form II.

The crystal form II of the present disclosure may have a DSC substantially the same as that shown in FIG. 9.

Figure 10:
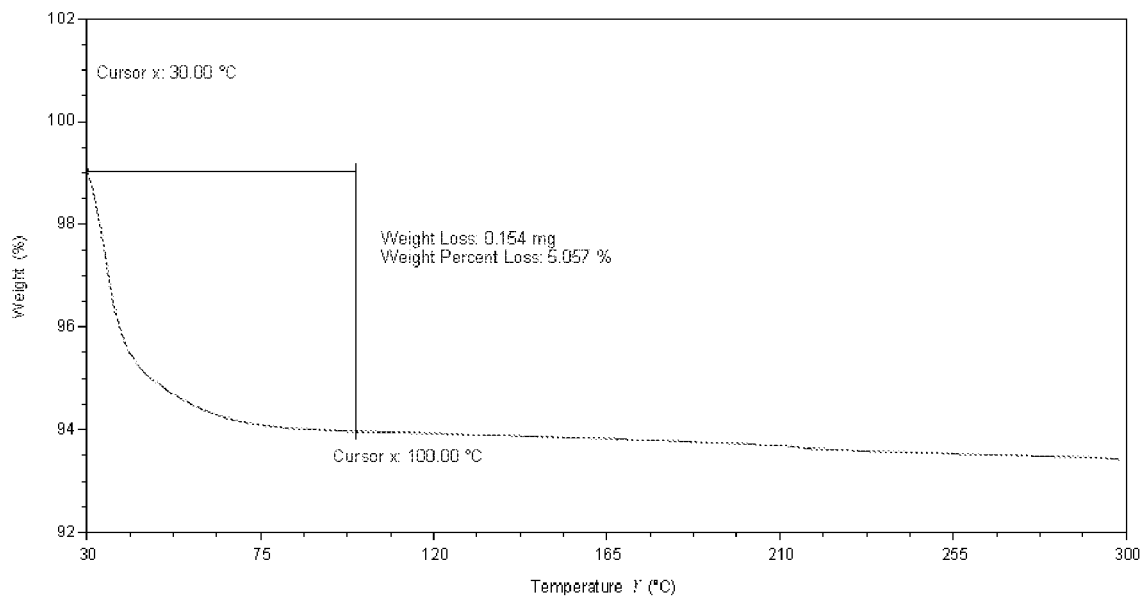
FIG. 10 shows TGA of the crystal form II.

The crystal form II of the present disclosure may have a TGA substantially the same as that shown in FIG. 10.

Figure 11:
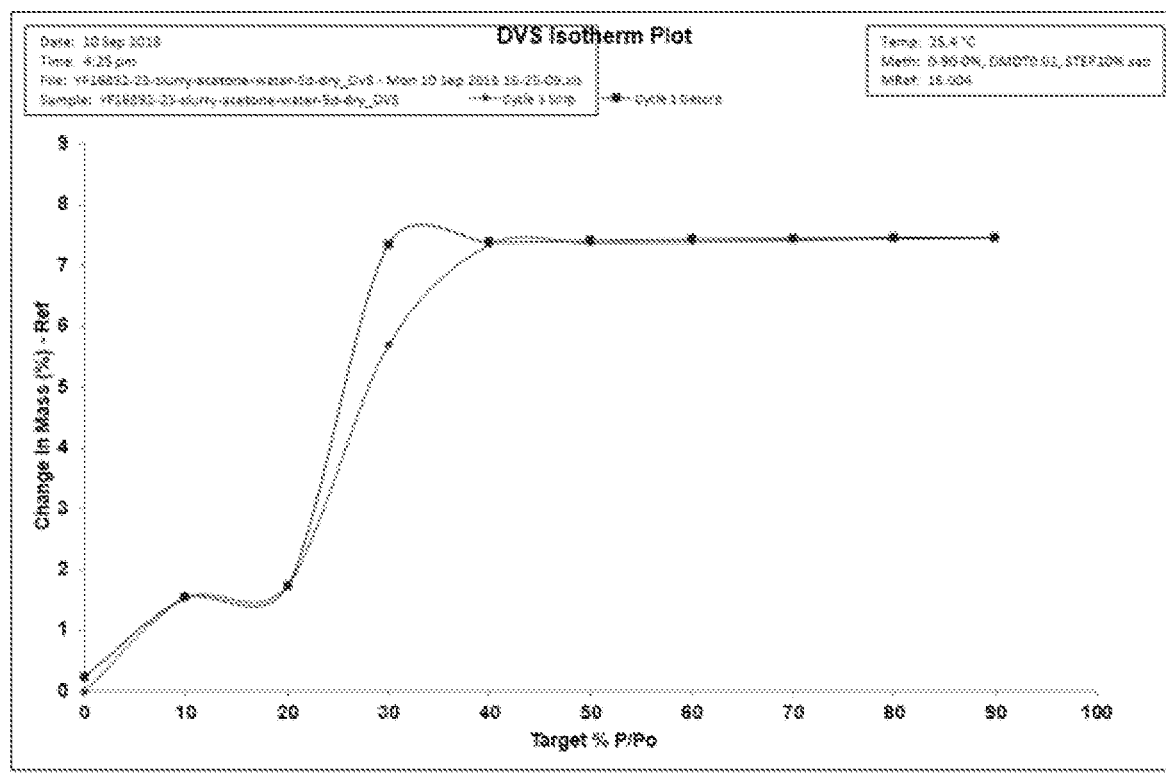
FIG. 11 shows DVS of the crystal form II.

The crystal form II of the present disclosure may have a DVS substantially the same as that shown in FIG. 11.

In some embodiments, the crystal form II of the present disclosure has at least one, any two, any three, or all four of the following (a) to (d):
(a) an XRPD pattern substantially the same as that shown in FIG. 8;
(b) a DSC thermogram substantially the same as that shown in FIG. 9;
(c) a TGA substantially the same as that shown in FIG. 10; and
(d) a DVS substantially the same as that shown in FIG. 11.

Crystal Form III

The XRPD pattern of crystal form III provided by the present disclosure includes diffraction peaks (characteristic peaks) at 2θ=12.5°±0.2°, 13.5°±0.2°, 16.7°±0.2°, and 17.6°±0.2°. Preferably, the XRPD pattern of the crystal form III further includes diffraction peaks at any one, any two or all three of 2θ=8.4°±0.2°, 11.2°±0.2°, and 15.8°±0.2°. Preferably, the crystal form III has an XRPD pattern substantially the same as that shown in FIG. 12.

Figure 13:
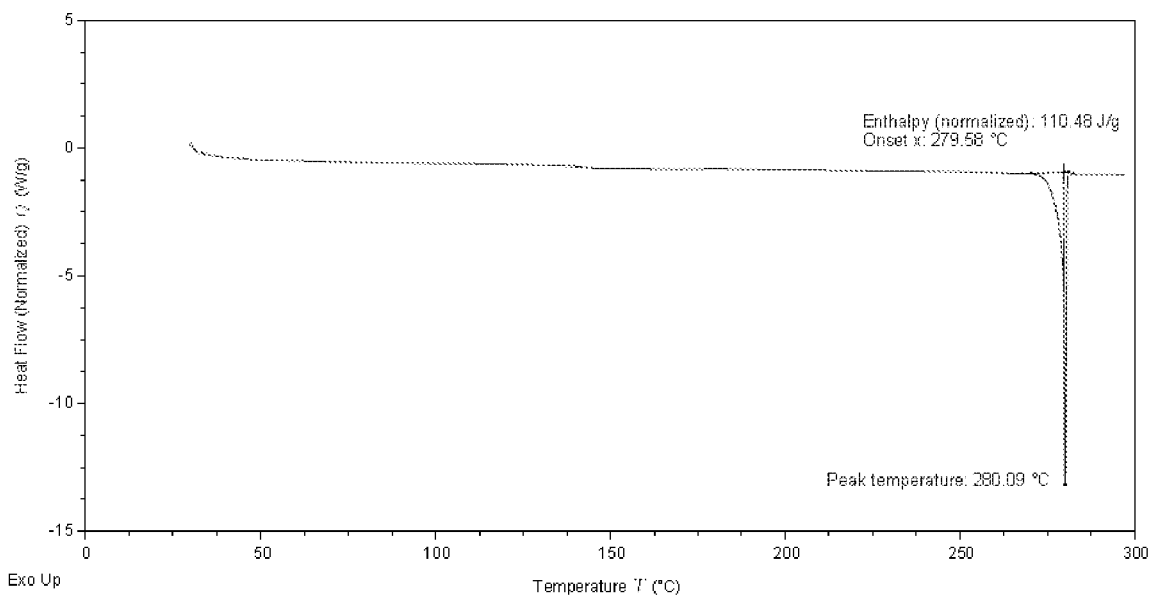
FIG. 13 shows DSC of the crystal form III.

The crystal form III of the present disclosure may have a DSC thermogram substantially the same as that shown in FIG. 13.

Figure 14:
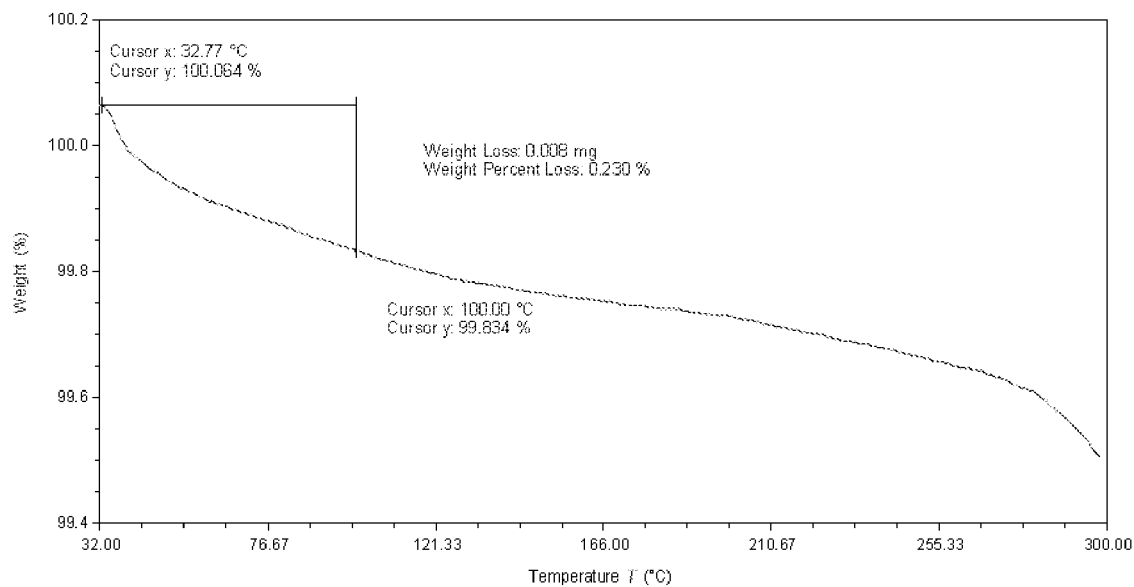
FIG. 14 shows TGA of the crystal form III.

The crystal form III of the present disclosure may have a TGA substantially the same as that shown in FIG. 14.

In some embodiments, the crystal form III of the present disclosure has at least one, any two or all three of the following (a) to (c):
(a) an XRPD pattern substantially the same as that shown in FIG. 12;
(b) a DSC thermogram substantially the same as that shown in FIG. 13; and
(c) a TGA substantially the same as that shown in FIG. 14.

Crystal Form V

The XRPD of crystal form V provided by the present disclosure includes diffraction peaks at 2θ=7.0°±0.2°, 13.9°±0.2°, 15.8°±0.2° and 24.9°±0.2°. Preferably, the crystal form V has an XRPD pattern substantially the same as that shown in FIG. 15.

Figure 16:
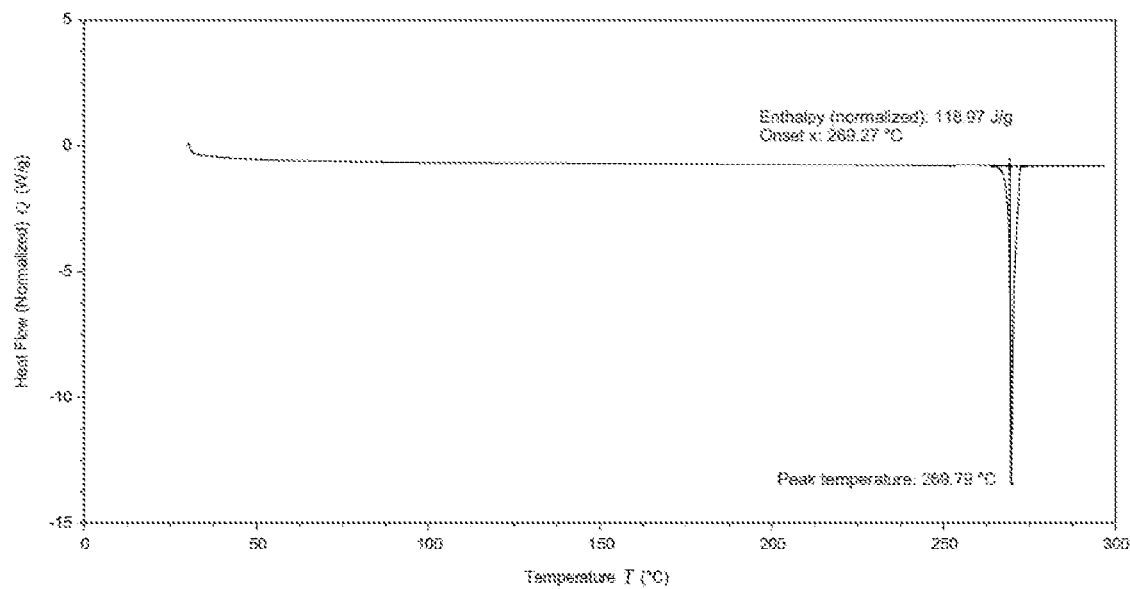
FIG. 16 shows DSC of the crystal form V.

The crystal form V of the present disclosure may have a DSC thermogram substantially the same as that shown in FIG. 16.

Figure 17:
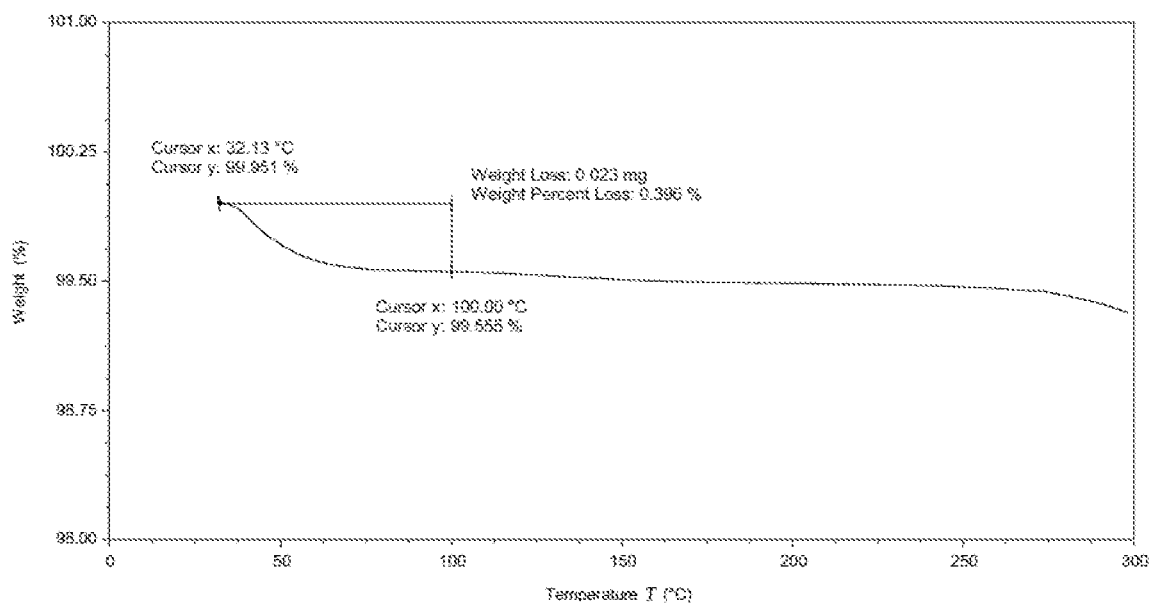
FIG. 17 shows TGA of the crystal form V.

The crystal form V of the present disclosure may have a TGA substantially the same as that shown in FIG. 17.

Figure 18:
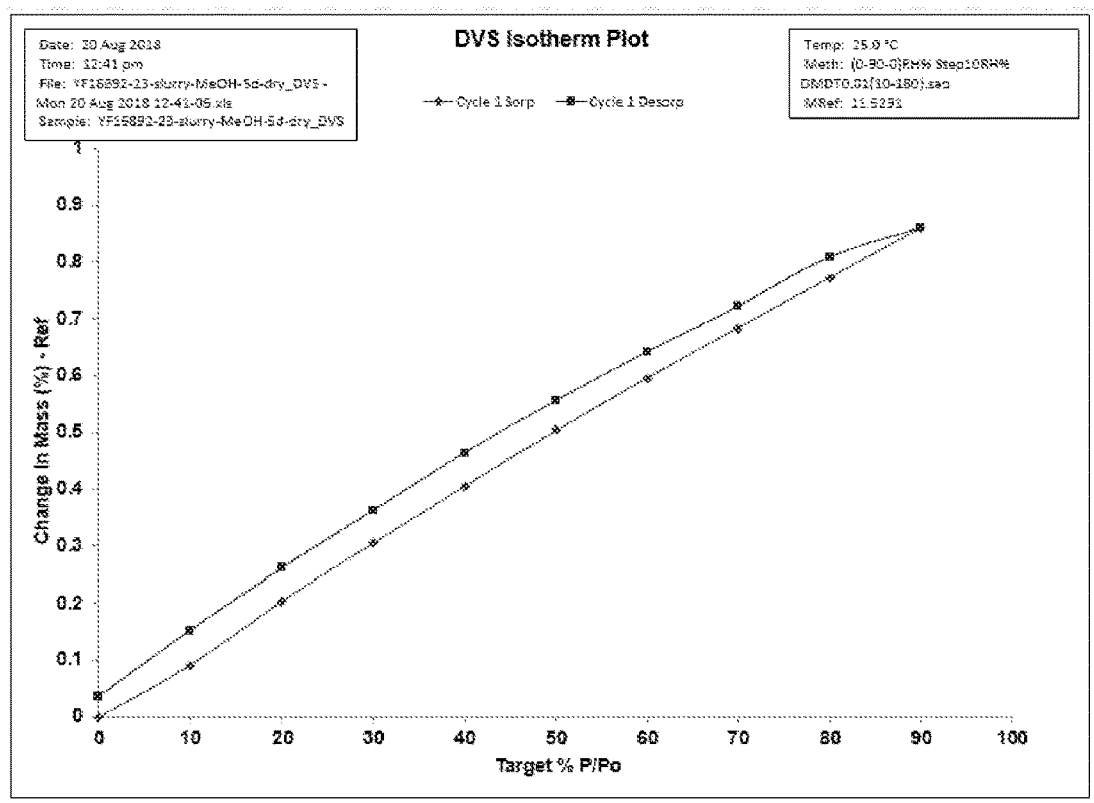
FIG. 18 shows DVS of the crystal form V.

The crystal form V of the present disclosure may have a DVS substantially the same as that shown in FIG. 18.

In some embodiments, the crystal form V of the present disclosure has at least one, any two, any three, or all four of the following (a) to (d):
(a) an XRPD pattern substantially the same as that shown in FIG. 15;
(b) a DSC thermogram substantially the same as that shown in FIG. 16;
(c) a TGA substantially the same as that shown in FIG. 17; and
(d) a DVS substantially the same as that shown in FIG. 18.

Crystal Form VI

The XRPD pattern of crystal form VI provided by the present disclosure includes diffraction peaks at 2θ=12.8°±0.2°, 13.3°±0.2°, 14.0°±0.2°, and 17.3°±0.2°. Preferably, the XRPD pattern of the crystal form VI further includes any one, any two, any three or all four diffraction peaks of 2θ=4.7°±0.2°, 8.6°±0.2°, 16.9°±0.2° and 17.9°±0.2°. Further preferably, the XRPD pattern of the crystal form VI further includes a diffraction peak at 2θ=8.4°±0.2°. Preferably, the crystal form VI has an XRPD pattern substantially the same as that shown in FIG. 19.

Figure 20:
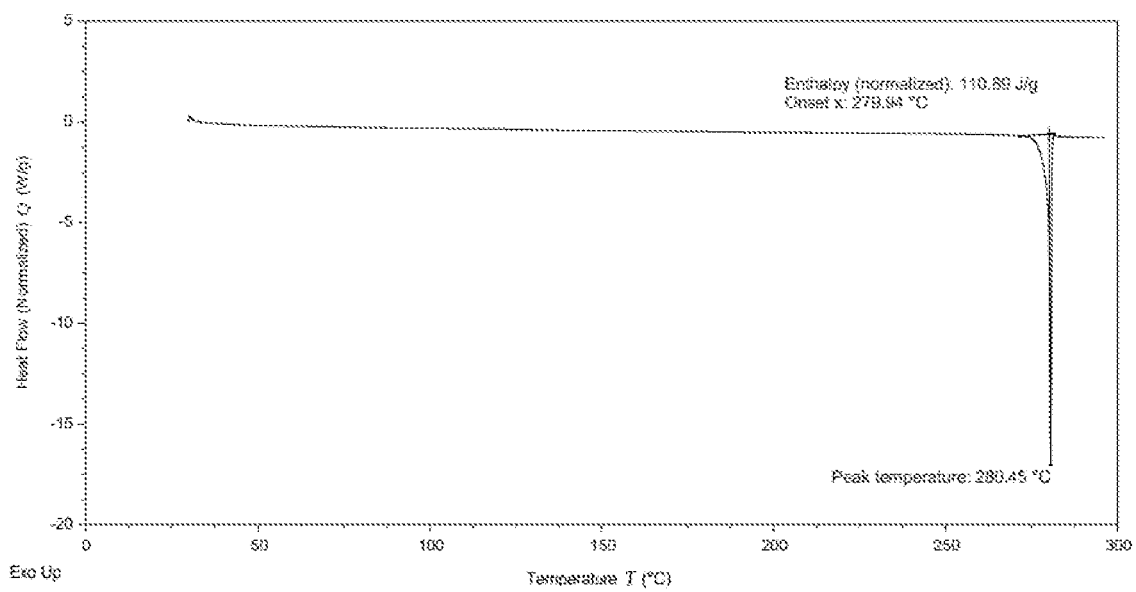
FIG. 20 shows DSC of the crystal form VI.

The crystal form VI of the present disclosure may have a DSC thermogram substantially the same as that shown in FIG. 20.

Figure 21:
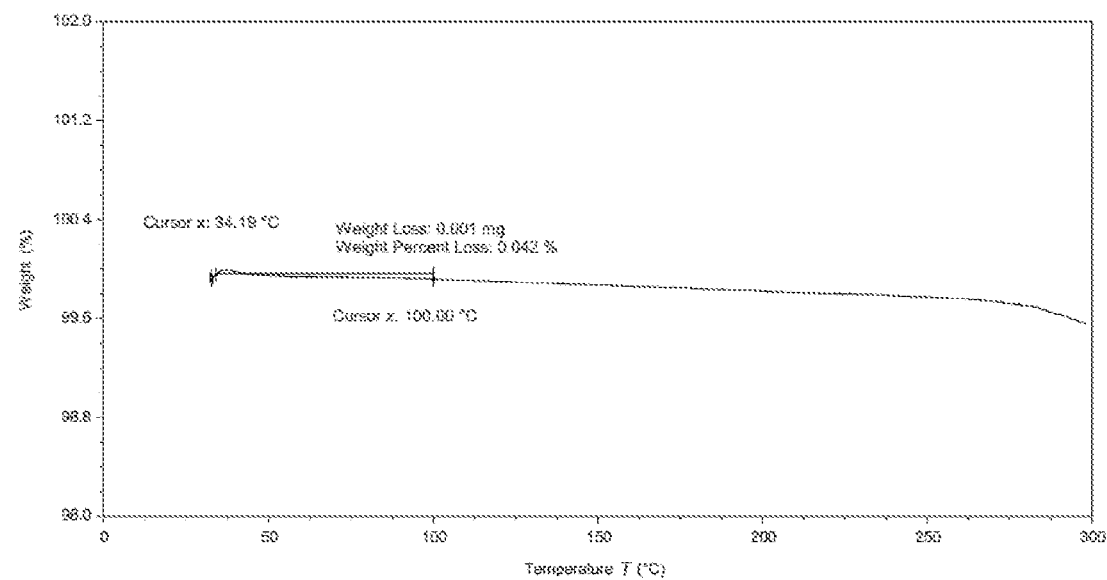
FIG. 21 shows TGA of the crystal form VI.

The crystal form VI of the present disclosure may have a TGA substantially the same as that shown in FIG. 21.

Figure 22:
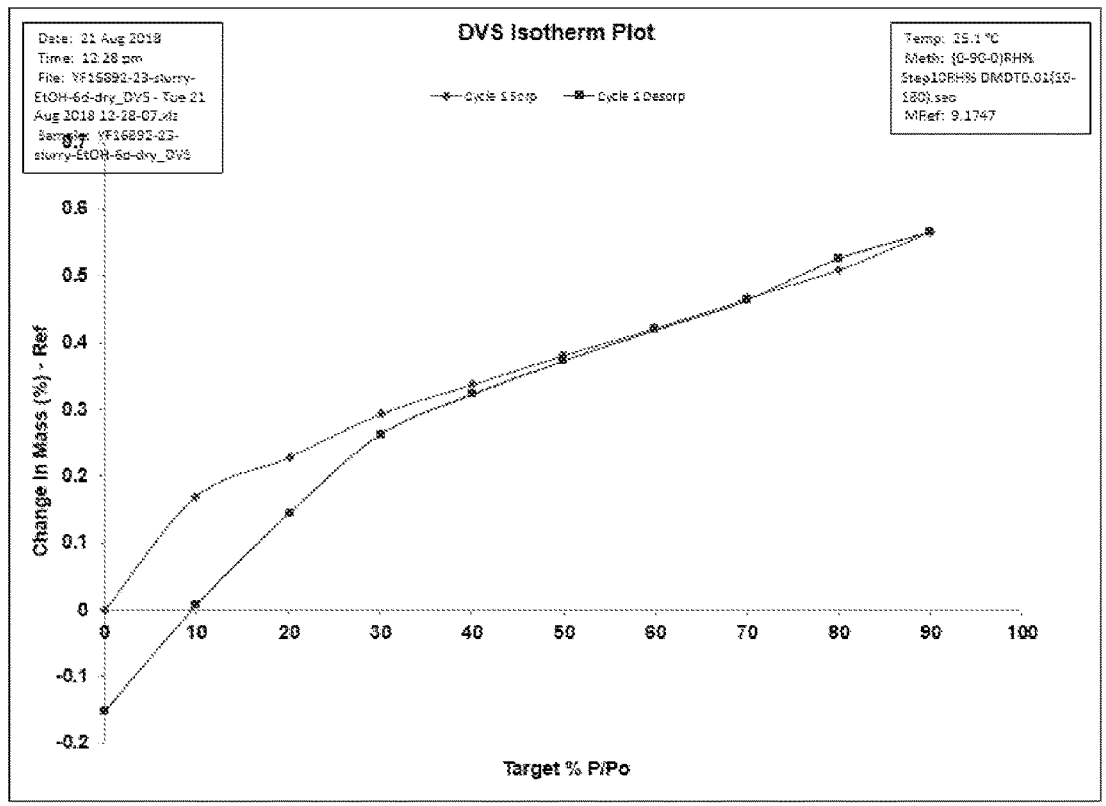
FIG. 22 shows DVS of the crystal form VI.

The crystal form VI of the present disclosure may have a DVS diagram substantially the same as that shown in FIG. 22.

In some embodiments, the crystal form VI of the present disclosure has at least one, any two, any three, or all four of the following (a) to (d):
(a) an XRPD pattern substantially the same as that shown in FIG. 19;
(b) a DSC thermogram substantially the same as that shown in FIG. 20;
(c) a TGA substantially the same as that shown in FIG. 21; and
(d) a DVS substantially the same as that shown in FIG. 22.

Crystal Form IX

The XRPD pattern of crystal form IX provided by the present disclosure includes diffraction peaks (characteristic peaks) at 2θ=14.5°±0.2°, 20.0°±0.2°, 21.6°±0.2°, and 26.7°±0.2°. Preferably, the XRPD pattern of the crystal form IX further includes any one, any two, any three or all four diffraction peaks of 2θ=12.1°±0.2°, 12.4°±0.2°, 14.9°±0.2° and 21.1°±0.2°. Preferably, the XRPD of the crystal form IX further includes any one, any two, any three, any four or all five diffraction peaks of 15.3°±0.2°, 17.4°±0.2°, 18.7°±0.2°, 21.9°±0.2° and 31.9°±0.2°. Preferably, the crystal form IX has an XRPD pattern substantially the same as that shown in FIG. 23.

Figure 24:
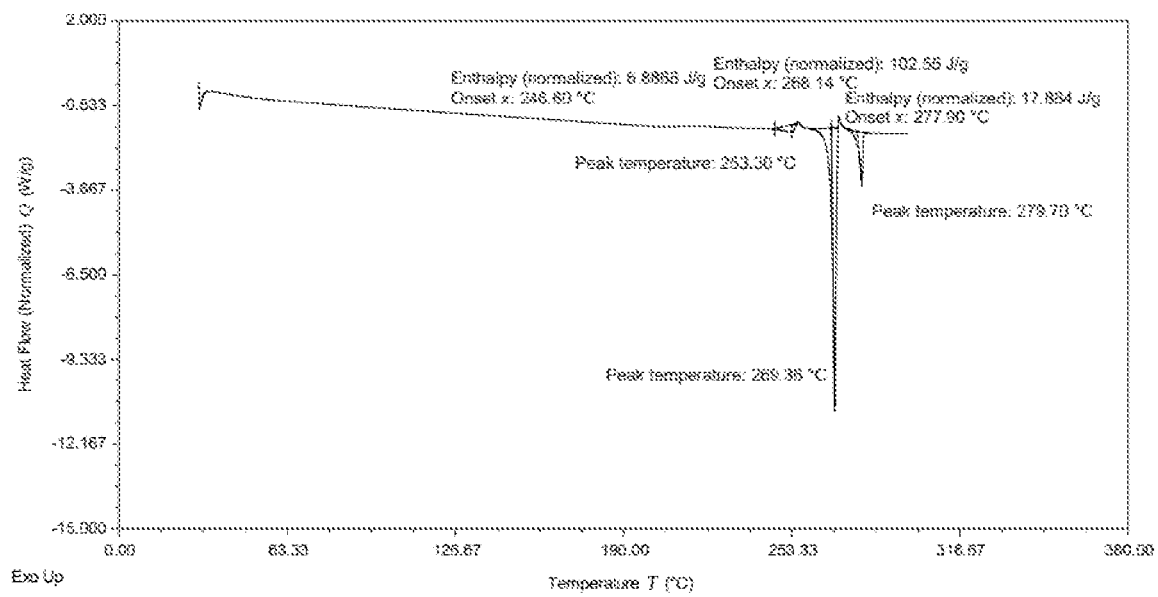
FIG. 24 shows DSC of the crystal form IX.

The crystal form IX of the present disclosure may have a DSC thermogram substantially the same as that shown in FIG. 24.

Figure 25:
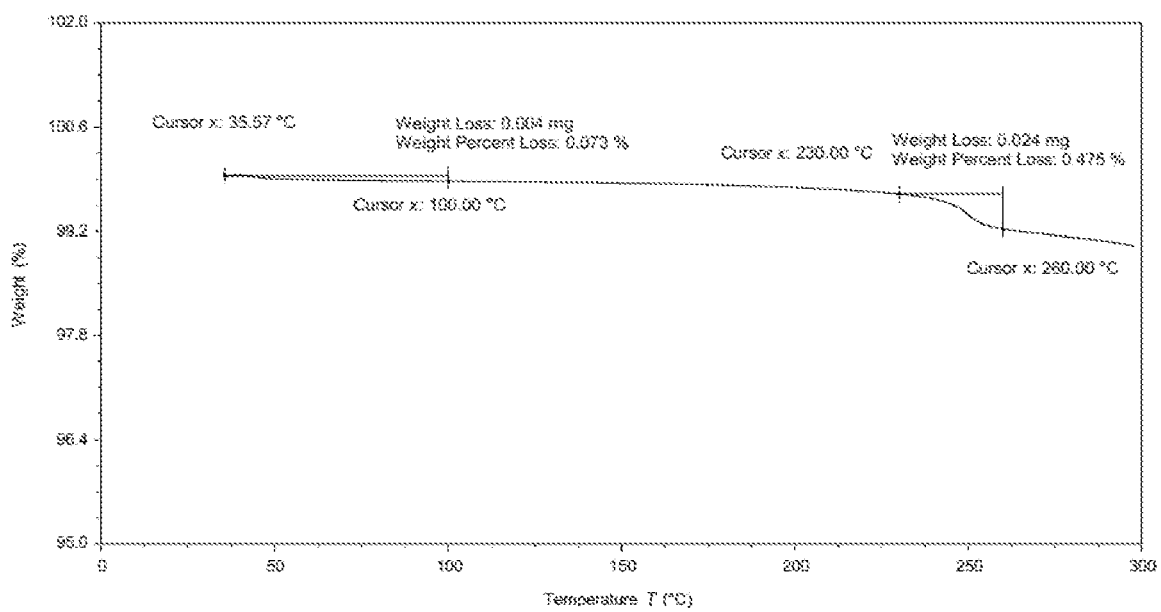
FIG. 25 shows TGA of the crystal form IX.

The crystal form IX of the present disclosure may have a TGA substantially the same as that shown in FIG. 25.

In some embodiments, the crystal form IX of the present disclosure has at least one, any two or all three of the following (a) to (c):
(a) an XRPD pattern substantially the same as that shown in FIG. 23;
(b) a DSC thermogram substantially the same as that shown in FIG. 24; and
(c) a TGA substantially the same as that shown in FIG. 25.

Crystal form X

The XRPD pattern of the crystal form X provided by the present disclosure includes diffraction peaks (characteristic peaks) at 2θ=7.5°±0.2°, 9.8°±0.2°, 11.3°±0.2°, and 14.8°±0.2°. Preferably, the XRPD of the crystal form X further includes a diffraction peak at 2θ=17.6°±0.2°. Preferably, the crystal form X has an XRPD pattern substantially the same as that shown in FIG. 26.

Figure 27:
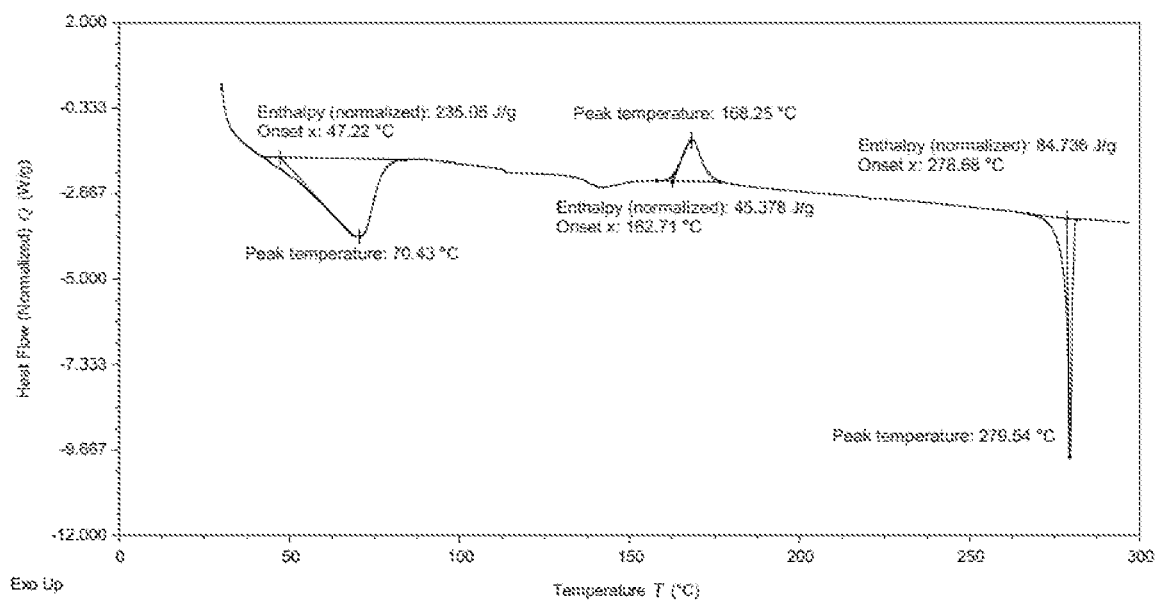
FIG. 27 shows DSC of the crystal form X.

The crystal form X of the present disclosure may have a DSC thermogram substantially the same as that shown in FIG. 27.

Figure 28:
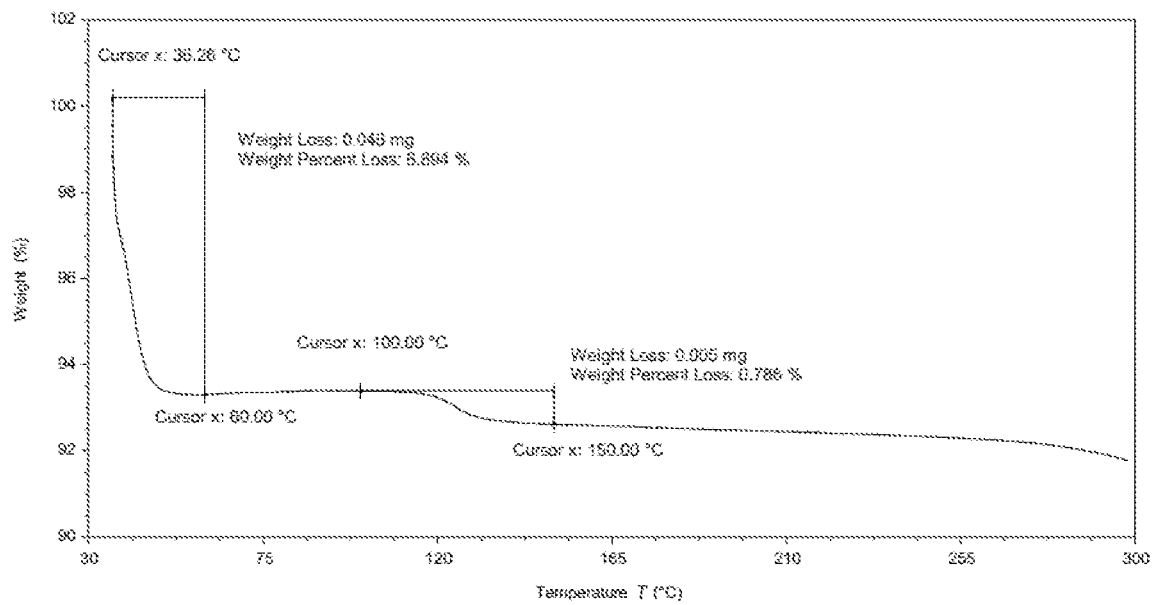
FIG. 28 shows TGA of the crystal form X.

The crystal form X of the present disclosure may have a TGA substantially the same as that shown in FIG. 28.

In some embodiments, the crystal form X of the present disclosure has at least one, any two or all three of the following (a) to (c):
(a) an XRPD pattern substantially the same as that shown in FIG. 26;
(b) a DSC thermogram substantially the same as that shown in FIG. 27; and
(c) a TGA substantially the same as that shown in FIG. 28.

Form XI

The XRPD pattern of the crystal form XI provided by the present disclosure includes diffraction peaks (characteristic peaks) at 2θ=6.8°±0.2°, 9.2°±0.2°, 11.0°±0.2°, and 17.2°±0.2°. Preferably, the crystal form XI has an XRPD pattern substantially the same as that shown in FIG. 29.

Figure 30:
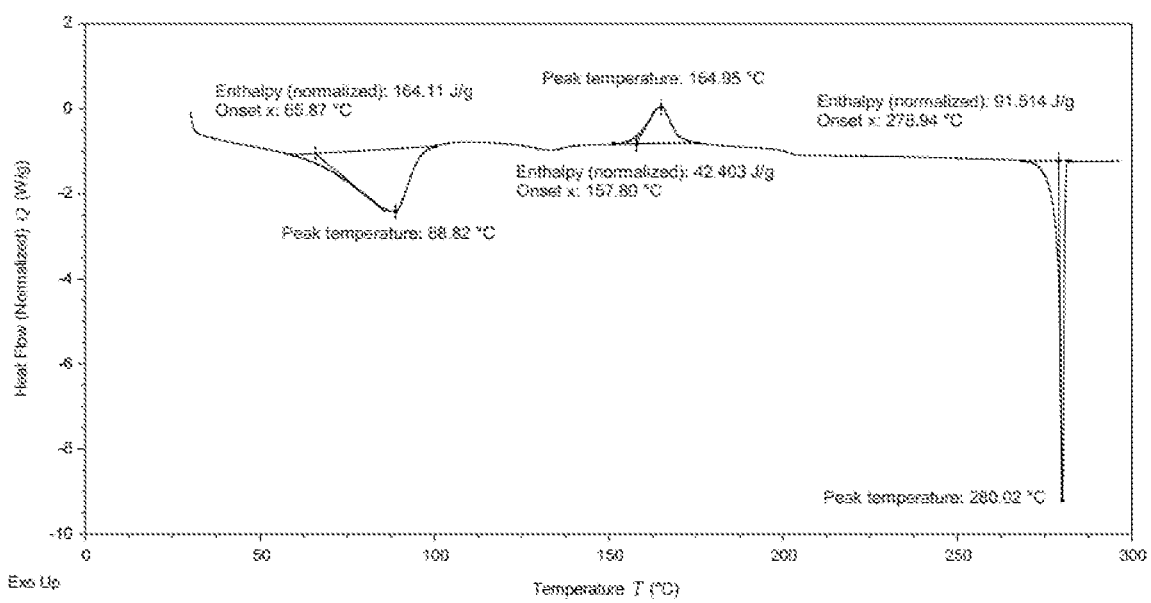
FIG. 30 shows DSC of the crystal form XI.

The crystal form XI of the present disclosure may have a DSC thermogram substantially the same as that shown in FIG. 30.

Figure 31:
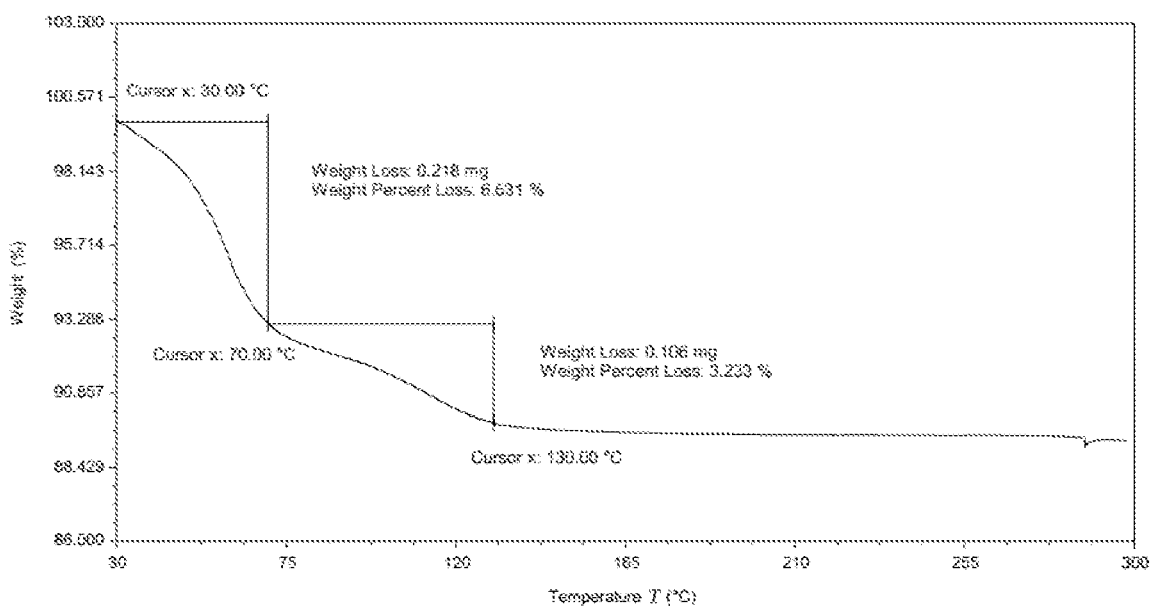
FIG. 31 shows TGA of the crystal form XI.

The crystal form XI of the present disclosure may have a TGA substantially the same as that shown in FIG. 31.

In some embodiments, the crystal form XI of the present disclosure has at least one, any two or all three of the following (a) to (c):
(A) an XRPD pattern substantially the same as that shown in FIG. 29;
(B) a DSC thermogram substantially the same as that shown in FIG. 30; and
(C) a TGA substantially the same as that shown in FIG. 31.

Figure 33:
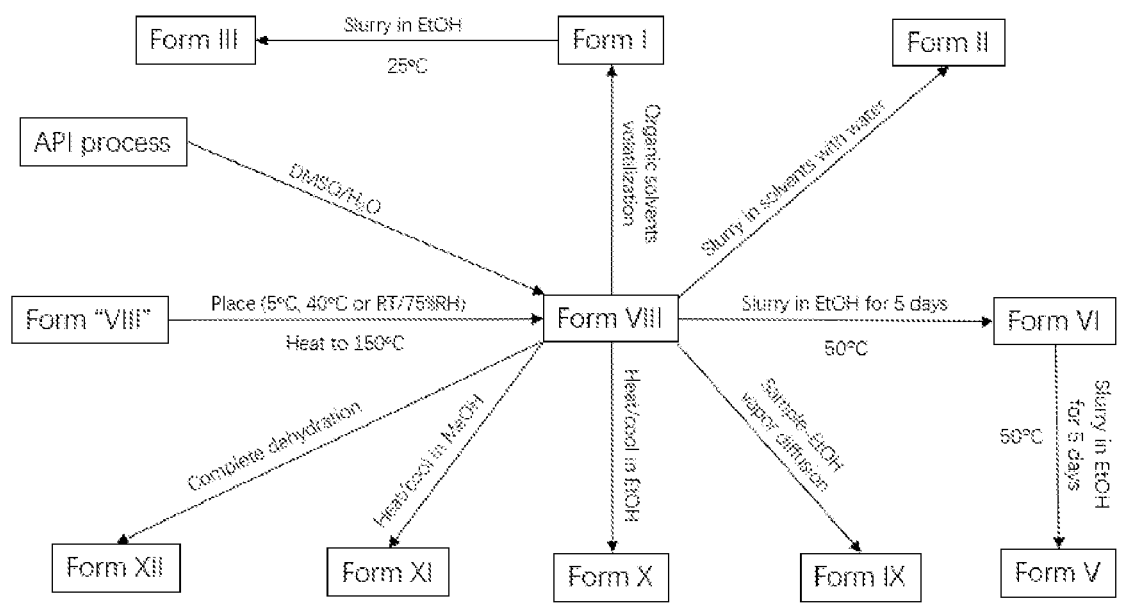
FIG. 33 shows the relationship diagram of all crystal forms.

FIG. 33 shows the crystal form relationship of the compound of Formula I of the present disclosure, and the starting crystal form is crystal form VIII. The crystal form "VIII" is a transient crystal form dehydrated from crystal form VIII under low humidity (about 30% RH) without the adequate moisture equilibrium and will further transform into crystal form XII after long-time moisture equilibrium. The crystal form XII is a hydrate or an anhydrous crystal form dehydrated from crystal form VIII under lower humidity (0-30% RH). Under certain humidity conditions, the crystal form "VIII" and crystal form XII will gradually transform into crystal form VIII.

Crystal form VIII will transform into crystal form II by slurrying in a solvent containing water (except DMSO/$H_2O$ system). The crystal form I is obtained by volatilization in common organic solvents, which is further slurried in ethanol at 25° C. to obtain the crystal form III. The crystal forms V, VI, IX and X can be obtained respectively from the crystal form VIII by different crystallization methods and conditions in ethanol, and the crystal form XI can be obtained by heating and cooling in methanol.

The physical characterization results show that the crystal forms III, V, VI and IX are anhydrous crystal forms, the crystal forms I, II, VIII, "VIII", X and XI are hydrated crystal forms. The crystal form XII is a crystal form dehydrated from crystal form VIII, which is stable only under low humidity.

The results of competition show that the crystal form V is the dominant anhydrous crystal form, the crystal form II is the dominant hydrated crystal form except in the DMSO/$H_2O$ system, and the crystal form VIII is the dominant hydrated crystal form in the DMSO/$H_2O$ system.

The physical stability results show that the dominant crystal forms V and II have no crystal form change after being placed for 2 weeks under accelerated and long-term conditions. The stability study results show that the crystal form VIII is stable under the long-term condition.

IV. Hydrate

The present disclosure specifically includes a hydrate of the compound 5-fluoro-1-(4-fluoro-3-(4-(pyrimidin-2-yl)piperazine-1-carbonyl)benzyl)quinazoline-2,4 (1H,3H)-dione. Preferably, each molecule of the compound includes 1~2 water molecules. More preferably, the compound 5-fluoro-1-(4-fluoro-3-(4-(pyrimidin-2-yl)piperazine-1-carbonyl)benzyl)quinazoline-2,4 (1H,3H)-dione provided by the present disclosure is a dihydrate, that is, each molecule of the compound includes 2 water molecules.

Preferably, the KF value of the hydrate of the present disclosure is 6%-10%, preferably 6.6%-9%.

Preferably, the crystal form of the hydrate of the present disclosure is the aforementioned crystal form I, II, VIII, "VIII'", X or XI, preferably crystal form VIII or crystal form "VIII'", more preferably crystal form VIII.

The hydrate of the present disclosure can be stably stored under the condition of a relative humidity of 10% or more, preferably 30% or more, and more preferably 40% or more. Generally, under the condition that the relative humidity is lower than 40% and the relative humidity is not 0%, each molecule of the compound of the present disclosure includes less than 2 water molecules; under the condition of 40% relative humidity or above, each molecule of the compound of the present disclosure includes two water molecules and is in a stable form.

V. Preparation Method

The present disclosure provides a preparation method of the compound 5-fluoro-1-(4-fluoro-3-(4-(pyrimidin-2-yl) piperazine-1-carbonyl)benzyl)quinazoline-2,4 (1H,3H)-di-one (Formula I), wherein the method includes:

(1) preparing a compound of Formula III from a compound of Formula IV with a compound of Formula V:

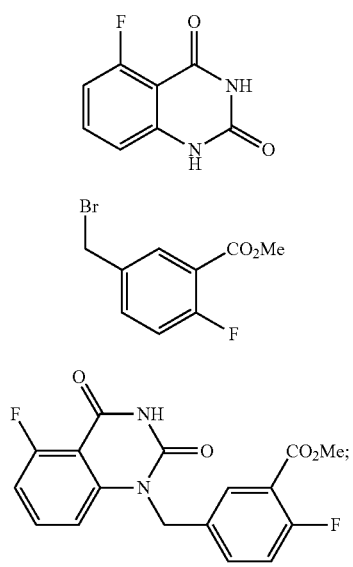

(2) hydrolyzing the compound of Formula III to obtain a compound of Formula II:

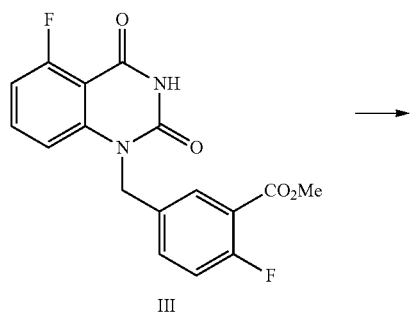

(3) preparing a compound of Formula I via a condensation reaction between the compound of Formula II and the compound of Formula A:

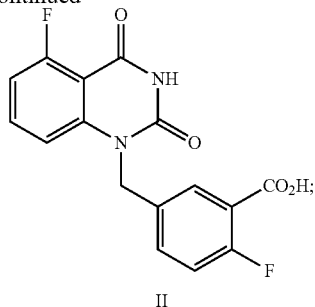

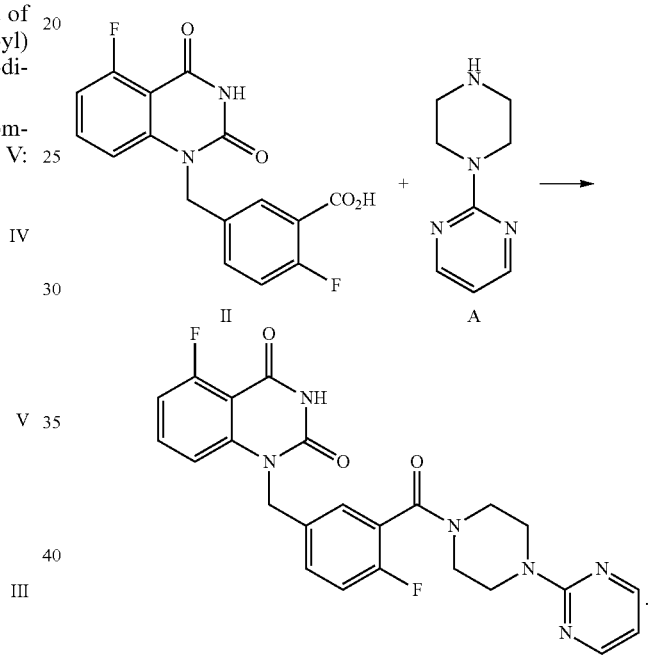

Preferably, in step (1), the compound of Formula III is prepared as follows:

(a) the compound of Formula IV and hexamethyldisilazane are reacted in an organic solvent (such as toluene) under an acidic condition (such as in the presence of sulfuric acid) to prepare an organic solution (such as toluene solution) of the compound of Formula IV-TMS;

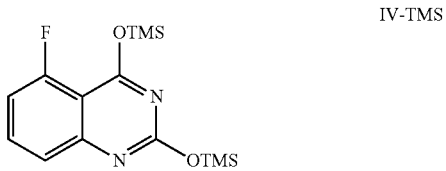

(b) the compound of Formula V and the compound of Formula IV-TMS in the organic solution obtained in step (a) are mixed in the presence of an organic solvent (such as sulfolane) and reacted to obtain a compound of Formula III.

Preferably, the reaction temperature of the compound of Formula IV and hexamethyldisilazane is 105-120° C, preferably 112-120° C.; the reaction time is 10-20 hours. More preferably, the compound of Formula IV is dissolved in a suitable organic solvent (such as toluene), hexamethyldisilazane is added, and then sulfuric acid is added dropwise. The mixed solution is stirred, for example, at about 105-120° C. (preferably 112-120° C.) for a suitable time (for example, about 10-20 hours) until the solid is completely dissolved. The reaction mixture is cooled to a suitable temperature (for example, about 55-65° C.), and then the reaction mixture is concentrated to obtain an organic solution (such as toluene) of the compound of Formula IV-TMS. Preferably, the volume of the organic solvent used to dissolve the compound of Formula IV is 5 to 6.5 times, such as about 6 times, that of the compound of Formula IV; the molar ratio of the compound of Formula IV to hexamethyldisilazane may be between 1:1.5 and 1:3, for example, about 1:2.5, and the molar ratio of the compound of Formula IV to sulfuric acid may be between 12:1 and 8:1, for example, about 10:1.

Preferably, the obtained organic solvent solution of the compound of Formula IV-TMS, without purification, is mixed with the compound of Formula V for reaction; preferably, in step (b), the sulfolane solution of the compound of Formula V is mixed with the organic solution (such as toluene) of the compound of Formula IV-TMS for reaction. The mixing can be carried out at 35-45° C., such as around 40° C. After the mixing is completed, the temperature is raised to the reaction temperature. The reaction temperature can be 95-105° C., and the reaction time (stirring time) can be 10-30 hours. In a preferred embodiment, in-process control is performed by HPLC analysis, where IPC is limited to IV/(IV+III+II)≤10.0%. If IV/(IV+III+II)>10.0%, stirring is continued until the limit value is met. After the reaction, alcohol (such as methanol) is added slowly with stirring for crystallization at 55-65° C. Then process water is added slowly with continued stirring at 20° C. and then centrifuged. The filter cake is rinsed with a methanol/H$_2$O solution (2 to 3 times the weight), and the filter cake is dried under reduced pressure for 10-30 hours to obtain the compound of Formula III. In a preferred embodiment, the process control of drying under reduced pressure is as follows: IPC is limited to KF≤2.0%, and residue methanol ≤1.0%. If the limits are not met, the drying under reduced pressure is continuing until the limits are met. Preferably, the molar ratio of the compound of Formula V to the compound of Formula IV may be between 1:1 and 2:1, such as about 1.5:1.

In step (2), preferably, the compound of Formula III is added to the mixture of an inorganic base (for example, KOH or NaOH) in aqueous solution and an organic solvent (for example, methanol or ethanol). Generally, the molar ratio of the inorganic base to the compound of Formula III in use is between 1.5:1 and 3.0:1, for example, about 2.3-2.5. The weight of the organic solvent is about 0.8-1.3 times that of the compound of Formula III. The weight of the water in the aqueous solution of inorganic base is about 2.8 to 3.5 times that of the compound of Formula III. The resulting mixture is stirred at suitable temperature (for example, about 30-50° C., preferably 30-40° C.) for suitable time, for example, about 1-6 hours, preferably 2-5 hours. Preferably, IPC is performed by HPLC analysis, wherein the criteria is III/(II+III)≤0.8%. If III/(II+III)>0.8%, the reaction time appropriately extends until the limit is met.

After the completion of reaction, an appropriate amount of water (2.5 to 4 times the weight of the compound of Formula III) and methanol (2 to 3 times the weight of the compound of Formula III) are added, and the pH of the reaction mixture is adjusted to 1.5-3 at the same temperature (for example, by adding inorganic acid dropwise), then stirred and slowly cooled down to 20-30° C. The inorganic acid can be hydrochloric acid, and its concentration can vary according to actual conditions, as long as the pH of the reaction mixture can be adjusted in the above range. After the stirring is completed, the reaction mixture is filtered. Then the filter cake is rinsed, for example, methanol/water (V:V, 1:1) and then methanol sequentially, and dried under reduced pressure to obtain the compound of Formula II. Preferably, the process control of drying under reduced pressure is as follows: IPC is limited to KF≤0.5%. If the limit requirement is not met, the drying under reduced pressure continues until the limit value is met.

Preferably, in step (3), the compound of Formula II is firstly dissolved in a suitable organic solvent (for example, ethyl acetate). The temperature of the reactor is controlled at 15-25° C., and the organic solvent solution of the compound of Formula II is added to the reactor. Then the temperature of the reactor is adjusted to 20±2° C. and suitable condensation reagents (such as HATU, TBTU, HBTU, T$_3$P, etc.) and suitable organic bases (such as NMM and DIPEA, etc.) are added, and then the reaction solution is heated to 35-45° C. An organic solvent (such as ethyl acetate) solution of the compound of Formula A is added and stirred for 15-25 hours. The compound of Formula II can be dissolved in an organic solvent (such as ethyl acetate) with the amount of about 10-20 times (weight ratio), such as about 16 times. The molar ratio of the condensation reagent to the compound of Formula II may be between 1:1 and 1:2.5, such as about 1:1.8; the molar ratio of the organic base to the compound of Formula II may be between 1:2 and 1:4, for example, about 1:3. The molar ratio of the compound of Formula A to the compound of Formula II may be between 2:1 and 0.8:1, for example about 1.2:1. Generally, the weight of the organic solvent is 2 to 4 times that of the compound of Formula A when preparing the solution of the compound of Formula A. Preferably, during the reaction, the process is controlled by HPLC, where the IPC is limited to: II/(II+I) ≤1.0%; if II/(II+I)>1.0%, keep stirring. If the limit still fails, a solution of 50% propyl phosphonic anhydride in ethyl acetate is added and stirring is continued until meeting the limit. After the completion of reaction, process water (0.1-0.5 times the weight of the compound of Formula A) is added to the reaction, stirred for 1-3 hours, filtered, and the filter cake is rinsed with ethyl acetate. The wet product is returned to the reactor, dimethyl sulfoxide (15 to 25 times the weight of the compound of Formula A) is added and stirred for 1-3 hours, then process water (1 to 5 times the weight of the compound of Formula A) and crystal seed of the compound of Formula I are added and continuously stirred and then filtered. The filter cake is rinsed with process water (3-6 times the weight of the compound of Formula A), and dried under reduced pressure at 50-60° C. for 50-70 hours, such as 60-70 hours, to obtain the compound of Formula I. During drying under reduced pressure, process control is performed by sampling and testing, where the IPC limit is: KF<0.5%. If the limit is not met, keep drying until meeting the limit. In some embodiments, the compound of Formula II is dissolved in ethyl acetate, the temperature of the reactor is controlled at 15-25° C., the ethyl acetate solution of the compound of Formula II is added to the reactor, and then the temperature of the reactor is adjusted to 20±2° C., the ethyl acetate solution of the condensation reagent propyl phosphonic anhydride and organic base diisopropylethylamine are added, the temperature of the reaction solution is raised to 35-45° C., the ethyl acetate solution of the compound of Formula A is added and stirred for 15-25 hours. After the completion of reaction, process water is added to the reaction product, stirred for 1-3 hours, filtered, the filter cake is rinsed with ethyl acetate, the wet product is returned to the reactor, dimethyl sulfoxide is added and stirred for 1-3 hours, then process water and crystal seed of crystal form VIII are added and stirred for 4-6 hours and then filtered, the filter cake is rinsed with process water, and dried under reduced pressure at 50-60° C. for 60-70 hours to obtain the compound of Formula I. The amount or weight ratio of each substance in the reaction system is as described above.

In the preferred embodiment, after drying under reduced pressure at 50-60° C. for 50-70 hours to obtain the compound of Formula I, a crystallization step is also followed; preferably, the crystallization is carried out under nitrogen atmosphere in a filter dryer. Specifically, the crystallization step includes: opening the nitrogen gas valve in a filter dryer and blowing wet nitrogen gas for 18-22 hours, thereby obtaining crystal form VIII.

In a preferred embodiment, the crystallization in a filter dryer may include the following steps: in particular, the compound of Formula I and dimethyl sulfoxide is mixed in the first reactor, and stirred at 55-65° C. until the resulting solution is clear. The amount of dimethyl sulfoxide may be 7-10 times, such as about 8 times the weight of the compound of Formula I. Purified water and dimethyl sulfoxide are added to the second reactor, then the temperature of the second reactor is adjusted to 50±3° C and the crystal seed of crystal form VIII are added; the amount of purified water can be 12-20 times the weight of the compound of Formula I, the amount of dimethyl sulfoxide can be 6-10 times the weight of the compound of Formula I, and the amount of crystal seed can be 0.003 to 0.007 times the weight of the compound of Formula I. The solution in the first reactor is slowly transferred to the second reactor, stirred until the obtained crystal form is consistent with the crystal form of reference standard, then filtered, and the filter cake is rinsed with purified water until the residual dimethyl sulfoxide is ≤2000 ppm, dried under reduced pressure in the reactor until KF≤8.0%, and then blown with wet nitrogen gas until KF is 6.6-9.0% and the XRPD is consistent with the reference standard, thereby obtaining crystal form VIII.

In some embodiments, the product produced from any of the above preparation methods is contemplated by the subject application. Preferably, the product contains the crystal form VIII with a KF value of 6%-10%, preferably 6.6%-9%.

VI. Method and Application

The compound of the present disclosure is a PARP inhibitor. Therefore, each crystal form and hydrate of the compound of the present disclosure can be used for manufacture of a medicament for treatment or prevention of clinical conditions responsive to the inhibition of PARP activity.

As used herein, clinical conditions responsive to the inhibition of PARP activity refer to diseases or conditions pathogenesis and development of which could be treated or prevented by inhibiting activity of PARP.

As used herein, clinical conditions responsive to the inhibition of PARP activity include cancers and other diseases responsive to the inhibition of PARP activity, such as excessive cell death, including central nervous system diseases such as stroke and neurodegenerative diseases.

The cancer responsive to the inhibition of PARP activity includes, but is not limited to, liver cancer, melanoma, Hodgkin's disease, non-Hodgkin's lymphoma, acute lymphoid leukemia, chronic lymphoid leukemia, multiple myeloma, neuroblastoma, breast cancer, ovarian cancer, lung cancer, Wilms tumor, cervical cancer, testicular cancer, soft tissue sarcoma, primary macroglobulinemia, bladder cancer, chronic myeloid leukemia, primary brain cancer, malignant melanoma, small cell lung cancer, gastric cancer, colon cancer, malignant pancreatic islet tumor, malignant carcinoid cancer, choriocarcinoma, granuloma fungoides, head and neck cancer, osteogenic sarcoma, pancreatic cancer, acute granulocytic leukemia, hairy cell leukemia, rhabdomyosarcoma, Kaposi's sarcoma, genitourinary tumor disease, thyroid cancer, esophageal cancer, malignant hypercalcemia, cervical hyperplasia, renal cell carcinoma, endometrial cancer, polycythemia vera, idiopathic thrombocytosis, adrenal cortical cancer, skin cancer and prostate cancer.

Therefore, the present disclosure provides use of the hydrate according to the present disclosure and the crystal forms I, II, III, V, VI, VIII, IX, X, XI, XII and "VIII" or a mixture of two or more of the crystal forms mentioned above in the preparation of a medicament for treatment or prevention of clinical conditions responsive to the inhibition of PARP activity, especially the cancers described herein.

In a particularly preferred embodiment, the present disclosure provides use of the dihydrate form of the molecule according to the present disclosure in the preparation of a medicament for treatment or prevention of clinical conditions responsive to the inhibition of PARP activity, especially the cancers described herein.

In a particularly preferred embodiment, the present disclosure provides use of the crystal form VIII according to the present disclosure as a drug substance in the preparation of a medicament for treatment or prevention of clinical conditions responsive to the inhibition of PARP activity, especially the cancers described herein.

Also provided are the hydrates according to the present disclosure and the crystal form I, II, III, V, VI, VIII, IX, X, XI, XII and "VIII" according to the present disclosure or a mixture of two or more of the above crystal forms, especially dihydrate, and crystal form VIII, crystal form "VIII" or crystal form XII and any mixtures thereof for use in the preparation of a medicament for treatment or prevention of clinical conditions responsive to the inhibition of PARP activity, such as cancer, especially the cancers described herein.

Also there is a method for preparing a medicament, which includes the step of mixing the crystal form or a mixture of the crystal forms according to the present disclosure, especially the crystal form VIII, with a pharmaceutically acceptable carrier or excipient. Preferably, the method further includes a step of granulating or tableting. Examples of pharmaceutically acceptable carriers or excipients include but are not limited to those disclosed in WO2016155655. Preferably, the medicament is an amorphous solid dispersion described in WO2016155655, which is incorporated herein by reference in its entirety.

The following examples further illustrate the embodiments herein, which should not be construed as limiting the scope of the embodiments described herein. Compounds, starting materials and reagents useful in the processes described herein, such as compounds of formula V, can be obtained from commercial sources or prepared using methods known to those skilled in the art.

EXAMPLE 1: PREPARATION OF COMPOUND (I)

Example 1

Preparation of methyl 2-fluoro-5-((5-fluoro-2,4-dioxo-3,4-dihydroquinazolin-1(2H)-yl) methyl) benzoate (III)

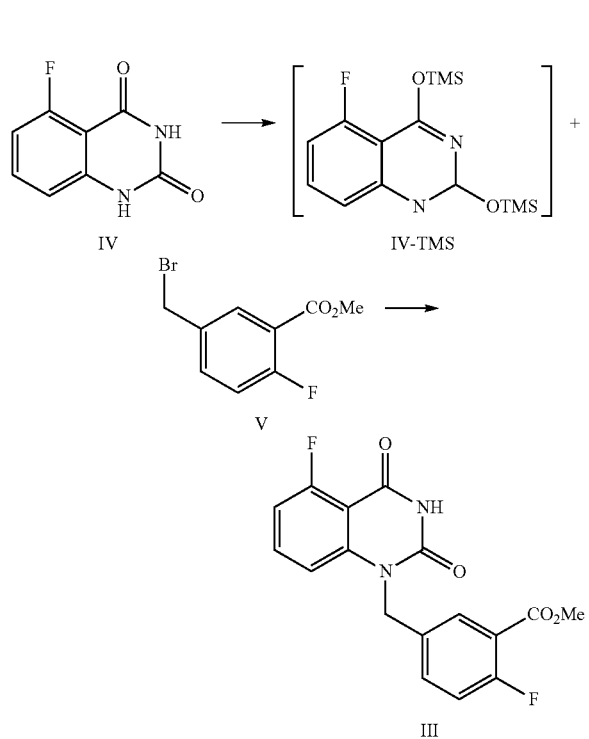

Preparation of IV-TMS: The reactor was treated with toluene to remove residual water before the reaction. To the toluene (254 kg, 5.9 V) solution of Compound IV (31.9 kg, 177.1 mol) was added sequentially hexamethyldisilazane (71.4 kg, 442.4 mol) and $H_2SO_4$ (1.7 kg, 17.3 mol) and the resulting mixture was stirred for 16 h at 112~120° C. The product IV-TMS solution in toluene was obtained after concentrated by vacuum below 65° C., which can be used directly.

Preparation of III: To the obtained toluene solution of IV-TMS was added the sulfolane solution of Compound V (264 kg) at 40° C., and the mixture was concentrated by vacuum at controlled temperature. The resulting mixture was stirred at 95-105° C. for 20 h and then cooled for sampling to do HPLC analysis for IPC (IPC criteria: IV/(IV+III+II)≤10.0%, if V/(IV+III+II)>10.0%, keep stirring until the criteria was met). MeOH was added into the reaction mixture at 55-65° C. slowly and followed by process water slowly for crystallization. The mixture was stirred at 20° C. and then filtered. After washed with MeOH/water (2.4 X) the wet cake was dried by vacuum for 20 h to meet the limits of KF≤2.0% and residual MeOH≤1.0% (If failed, keep drying). Finally, 52.3 kg of product III was obtained with 99.5% purity in 55% yield.

HPLC (std): 9.32 min. $^1$H NMR (400 MHz, DMSO-$d_6$): δ 11.72 (s, 1H), 7.87 (d, J=6.8 Hz, 1H), 7.64 (dd, J=6, 7 Hz, 2H), 7.32 (t, J=8.8 Hz, 1H), 7.00-7.09 (m, 2H), 5.33 (s, 2H).

Example 2

Preparation of 2-fluoro-5-((5-fluoro-2,4-dioxo-3,4-dihydroquinazolin-1(2H)-yl)methyl)benzoic acid (II)

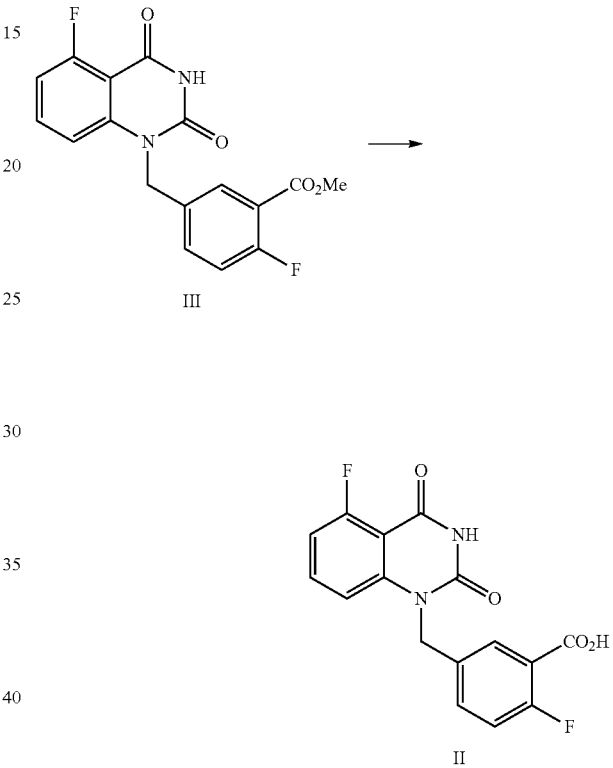

Under the $N_2$ protection, to the water (142 kg, 3.0 X) was added NaOH (12.7 kg, 317.5 mol) at 15-25° C. and the mixture was stirred for 20-40 min, to which was added MeOH (48 kg, 1.0 X) and Compound III (47.0 kg, 135.7 mol). The resulting mixture was stirred at 30-40° C. for 2~4 h and then tested with HPLC to meet the IPC criteria of III/(II+III)≤0.8% (if failed, keep stirring until the limit is met).

After the completion of reaction, to the mixture was added MeOH (113 kg, 2.4 X) and water (141 kg, 3.0 X), then followed by 2N aq. HCl (162 kg, 3.5 X) slowly at 30~40° C. to adjust the pH to 1.5~3.0. Cooling to 20~30° C. with stirring, the mixture was filtered, and the wet cake was rinsed with MeOH/water (1/1, v/v) and MeOH sequentially and then dried under reduced pressure. The cake was sampled and analyzed for IPC (the limit of KF is ≤0.5%. Keep drying if the above limit was not met). The product II (44.4 kg, 100% HPLC purity, 98% yield) was obtained.

HPLC (std): 9.97 min. $^1$H NMR(400 MHz, DMSO-$d_6$): δ 13.34 (brs, 1H), 11.73 (s, 1H), 7.84 (d, J=2 Hz, 1H), 7.66-7.61 (m, 1H), 7.82-7.63 (m, 2H), 7.27 (t, J=10.4 Hz, 1H), 7.10-7.03 (m, 2H), 5.32 (s, 2H).

Example 3

Preparation of 5-fluoro-1-(4-fluoro-3-(4-(pyrimidin-2-yl)piperazine-1-carbonyl)benzyl)quinazoline-2,4 (1H,3H)-dione dihydrate (I-A)

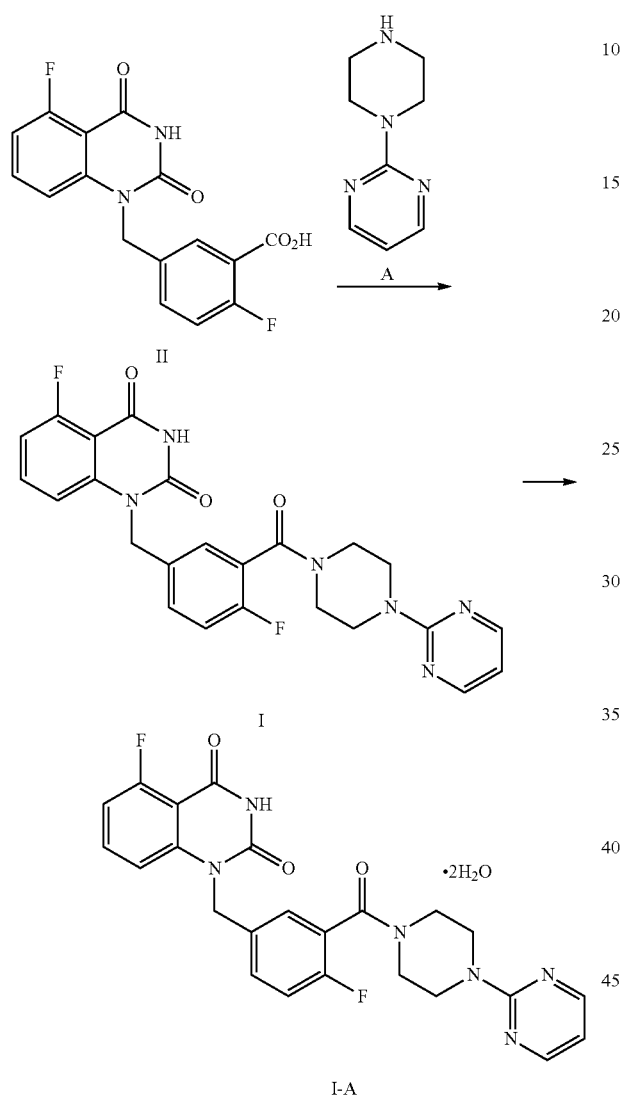

Synthesis: The EtOAc solution of Compound A was prepared by dissolving Compound A (23.15 kg, 141.0 mol) in EtOAc (121 kg, 3.0 X) at 15~25° C. under stirring. To the reactor was added Compound II (40.0 kg, 120.4 mol) and EtOAc (638 kg, 16.0 X) at 15~25° C. At the targeted temperature (20° C.), 50% EtOAc solutioin of propyl phosphonic anhydride (139.2 kg, 218.7 mol), and DIPEA (48.1 kg, 372.2 mol) were added. The reaction mixture was raised to 35~45° C. and the prepared EtOAc solution of Compound A was added slowly. After stirred at 35~45° C. for 18~22 h, the reaction mixture was cooled and tested with HPLC (the IPC criteria was II/(II+I)≤1.0%, if it failed, keep stirring; if it failed once again, 50% EtOAc solution of propyl phosphonic anhydride was added until the criteria was met).

After the completion of reaction, water (12 kg, 0.30 X) was added, and the resulting mixture was stirred for 1-3 h before filtering. After washed with EtOAc, the wet cake was returned to the reactor and stirred with DMSO (840 kg, 21.0 X) for 1-3 hours. Water (92 kg, 2.3 X) and Form VIII crystal seeds were added and stirred and filtered. The filter cake was washed with water (5.0 X) and dried by vacuum at 50-60° C. for 64 h until the IPC limit of KF≤0.5% was met (if it failed, keep drying) to give 46.3 kg of the final product 5-fluoro-1-(4-fluoro-3-(4-(pyrimidin-2-yl) piperazine-1-carbonyl)benzyl)quinazoline-2,4 (1H,3H)-dione (I) with 74% yield as an off-white solid.

HPLC(std): 23.05 min. $^1$H NMR(400 MHZ, DMSO-$d_6$): δ 11.68 (brs, 1H), 8..39 (d, J=4.8 Hz, 2H), 7.42 (t, J=15.6 Hz, 1H), 7.32-7.27 (m, 3H), 7.04 (t, J=9.2 Hz, 2H), 6.68 (t, J=4.8 Hz, 1H), 5.32 (s, 2H), 3.82-3.81 (m, 2H), 3.70-3.64 (m, 4H), 3.24-3.22 (m, 2H).

Crystallization: in the reactor R1, 5-fluoro-1-(4-fluoro-3-(4-(pyrimidin-2-yl) piperazine-1-carbonyl)benzyl)quinazoline-2,4(1H,3H)-dione (I, 42.0 kg, 87.8 mol) was dissolved in DMSO (338 kg, 8.0 X) and stirred at 55-65° C. until the mixture was clear. To the reactor R2 was added purified water (672 kg, 16.0 X) and DMSO (372 kg, 8.9 X) and the mixture in R2 was warmed up to 50° C. prior to the addition of crystal seed form VIII (0.21 kg, 0.005 X). The prepared solution in R1 was transferred to R2 slowly and stirred, and the mixture was sampled to ensure the XRPD pattern consistent with the reference standard (if it failed, keep stirring). Then the mixture was filtered, and the filter cake was washed with purified water.

Sampling for GC analysis were used for IPC (the limit of DMSO was ≤2000 ppm; if it failed, keep washing with purified water). The filter cake in a filter dryer was dried by vacuum until KF≤8.0% (if it failed, keep drying), and then blew with wet $N_2$ until KF met the range of 6.6~9.0% and XRPD conformed to reference standard (if it failed, keep blowing with wet $N_2$). Finally, 42.8 kg of 5-Fluoro-1-(4-fluoro-3-(4-(pyrimidin-2-yl)piperazine-1-carbonyl)benzyl) quinazoline-2,4 (1H,3H)-dione dihydrate (I-A) was obtained with 94% yield as an off-white solid.

HPLC(std): 23.05 min. $^1$H NMR(400 MHZ, DMSO-$d_6$): δ 11.68 (brs, 1H), 8..39 (d, J=4.8 Hz, 2H), 7.42 (t, J=15.6 Hz, 1H), 7.32-7.27 (m, 3H), 7.04 (t, J=9.2 Hz, 2H), 6.68 (t, J=4.8 Hz, 1H), 5.32 (s, 2H), 3.82-3.81 (m, 2H), 3.70-3.64 (m, 4H), 3.24-3.22 (m, 2H).

EXAMPLE II: CRYSTAL FORM STUDIES OF COMPOUND I

1. Instrument Parameters and Testing Method

1). X-Ray Powder Diffraction (XRPD, Manufacturer: Brucker; Model: D8 Advance)

About 10 mg of sample was placed on monocrystal silicon sample holder evenly. The sample was tested by X-ray Powder Diffraction using the method below:
Tube: Cu/K- Alpha (λ=1.54179Å);
Generator: Voltage: 40 KV; Current: 40 mA;
Scan Scope: 3-40 deg.;
Rotation Speed: 15 rmp;
Scan Speed: 10 deg/min.

2). Differential Scanning Calorimetry (DSC, Manufacturer: TA; Model: Q2000)

Around 1 mg of sample was weighed into a pin-hole aluminum pan. The sample was tested by DSC. The parameters of DSC were set as below: ramping 10° C/min from room temperature to 300° C.

3). Thermal Gravimetric Analyzer (TGA, Manufacturer: TA, Model: Q5000IR)

About 5 mg of sample was placed into a crucible and tested by TGA. The parameters of TGA were set as follows: ramping 10° C/min from room temperature to 300° Cf.

4). Dynamic Vapor Sorption (DVS, Manufacture: SMS; Model: Advantage-1)

About 10 mg of sample was transferred to a DVS sample pan and the weight change as the humidity of the environment at 25° C. changes was recorded. The parameters of TGA were set as follows:
Equilibrium dm/dt: 0.01%/min: (minimum: 10 min; maximum: 180 min);
Drying: 0% RH, 120 min;
RH (%) gradients: 10%;
RH (%) cycle: 0%-90%-0%.
Definition on Hygroscopicity

| Classification | Mass Increase caused by Hygroscopicity* |
| --- | --- |
| Deliquescent | Sufficient water is absorbed to form liquid. |
| Extremely Hygroscopic | The increase in mass is not less than 15%. |
| Hygroscopic | The increase in mass is less than 15% but not less than 2%. |
| Slightly Hygroscopic | The increase in mass is less than 2% but not less than 0.2%. |
| Practical non-hygroscopic | The increase in mass is less than 0.2% |

*Mass increase caused by hygroscopicity under the condition of 25° C./80% RH (Refer to China Pharmacopeia General Chapter 9103 Guidance for Hygroscopicity).

5). HPLC Method Parameters

| Instrument | Agilent 1260 HPLC | |
| --- | --- | --- |
| Column | Waters XBridge C18(150*4.6 mm 3.5 um) (PDS-HPLC-196) | |
| Gradient program | Time (min) | A: 0.05% TFA in water (v/v) | B: 0.05% TFA in ACN (v/v) |
| | 0.01 | 95 | 5 |
| | 20.0 | 5 | 95 |
| | 25.0 | 5 | 95 |
| | 25.01 | 95 | 5 |
| | 35.0 | 95 | 5 |
| Flow Rate | 1.0 mL/min | |
| Oven Temperature | 30° C. | |
| Wavelength | 220 nm | |
| Injection Volume | 5 μl | |

2. Crystal Form Screening and Results

Example 4: Form VIII of Compound I-A

Compound I-A obtained from Example 3 was characterized by XRPD, DSC, TGA and DVS, and finally was identified as Crystal Form VIII.

Figure 2:
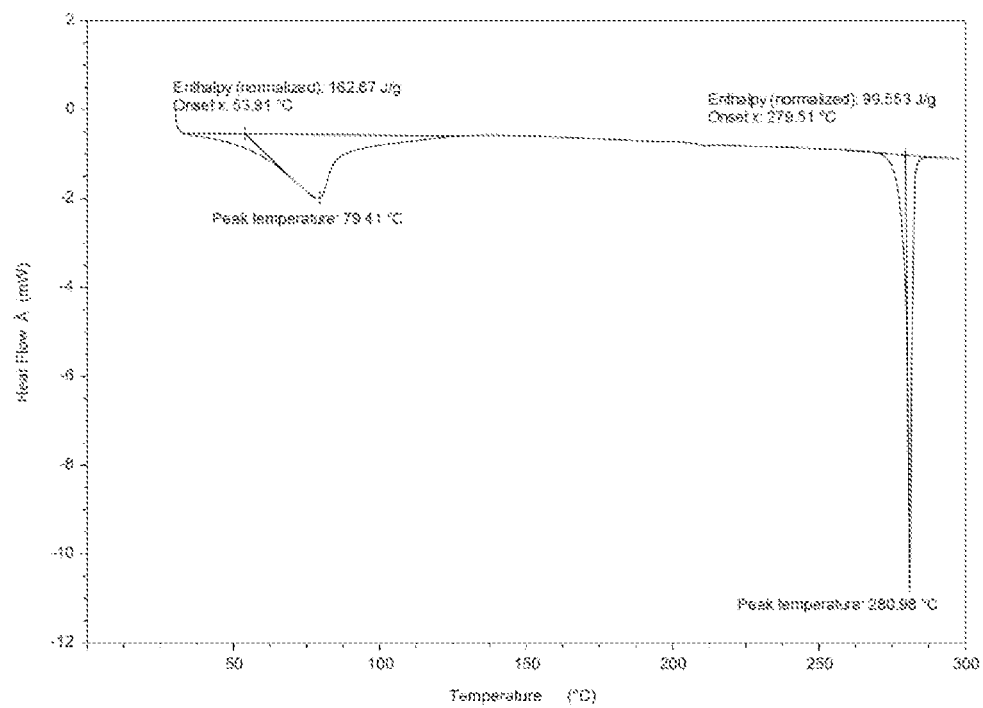
FIG. 2 shows DSC of the crystal form VIII.
Figure 3:
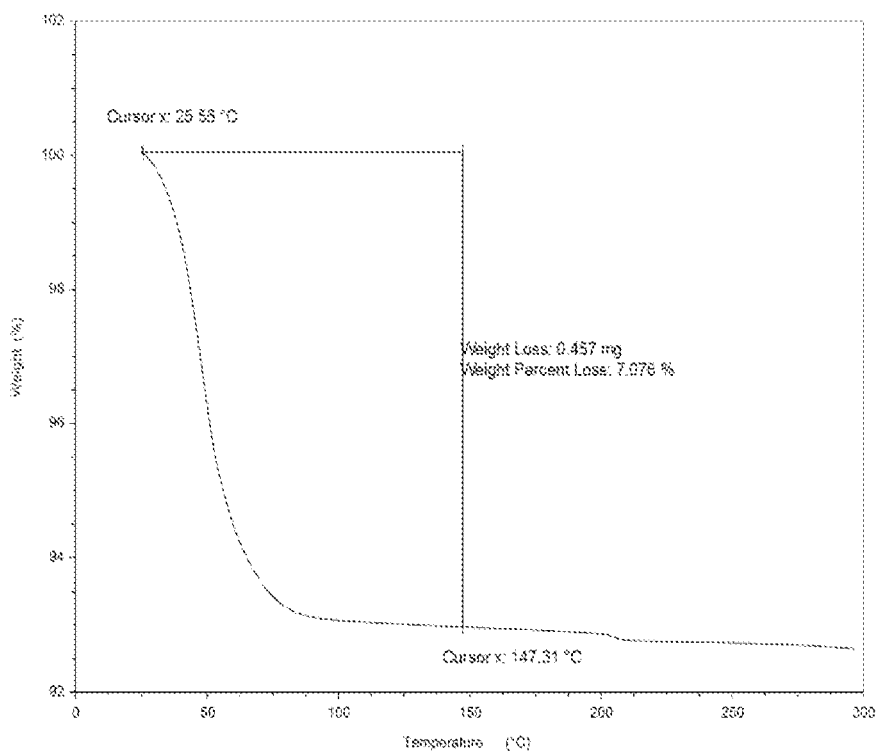
FIG. 3 shows TGA of the crystal form VIII.
Figure 4:
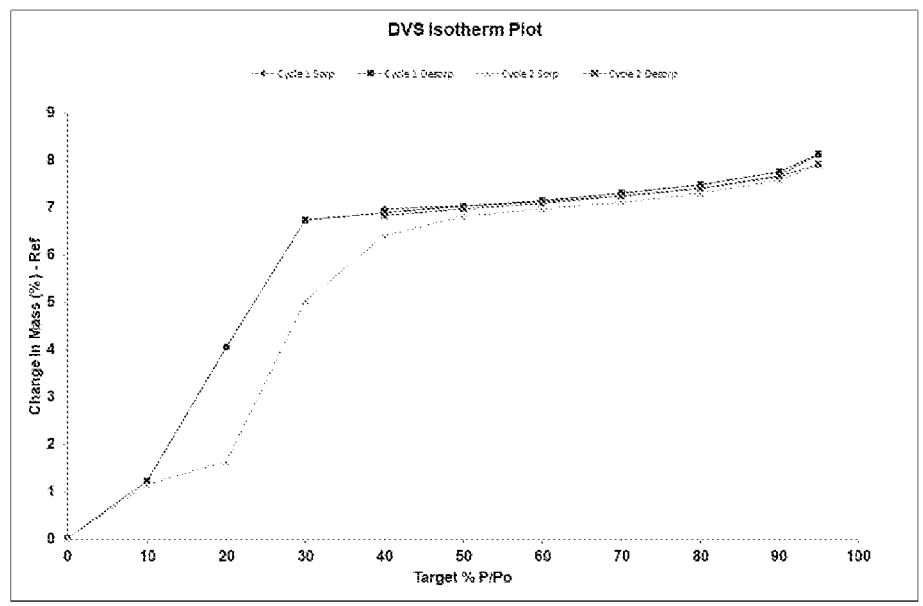
FIG. 4 shows DVS of the crystal form VIII.

The XRPD of Crystal Form VIII was shown in FIG. 1; the DSC of Crystal Form VIII was shown in FIG. 2; the TGA of Crystal Form VIII was shown in FIG. 3; the DVS of Crystal Form VIII was shown in FIG. 4.

Example 5: Crystal Form I of Compound I

About 20 mg of Compound I-A (Crystal Form VIII) was dissolved in a certain amount of solvents (shown in the table below) in 4 mL vial to obtain a slightly supersaturated solution and the suspension was filtered. The obtained filtrate was covered by a pin-hole aluminum foil for preventing pollution and slowly evaporated in a fume hood. After the evaporation was completed, solid residuals were dried at 40° C. by vacuum overnight and then examined by XRPD for their polymorphic Form. The results showed all the solvents system gave Crystal Form I.

| Solvent | Crystal Form (dried sample) |
| --- | --- |
| Acetonitrile | I |
| Acetone | I |
| THF | I |
| DCM | I |
| Chloroform | I |
| Dioxane | I |

Additionally, 200 mg of Compound I-A (Form VIII) was dissolved in 5 mL of DMF at 50° C. After filtration with a needle filter, 1 mL of the clear solution was transferred to a 40 mL glass vial and crystal seeds of Crystal Form I (with THF evaporated) were added into the solution to obtain a suspension. To the suspension was added 10 mL of cyclohexane slowly and then was stirred for 1 h at ambient temperature. The solid was collected after centrifugation, dried at 40° C. by vacuum overnight and examined by XRPD for its polymorphic Form which showed to be the Crystal Form I. Based on the data of DSC and TGA, Crystal Form I was most likely to be a hydrate of which the crystal form transformation temperature was 155° C. and the final melting point was around 280° C.

Figure 5:
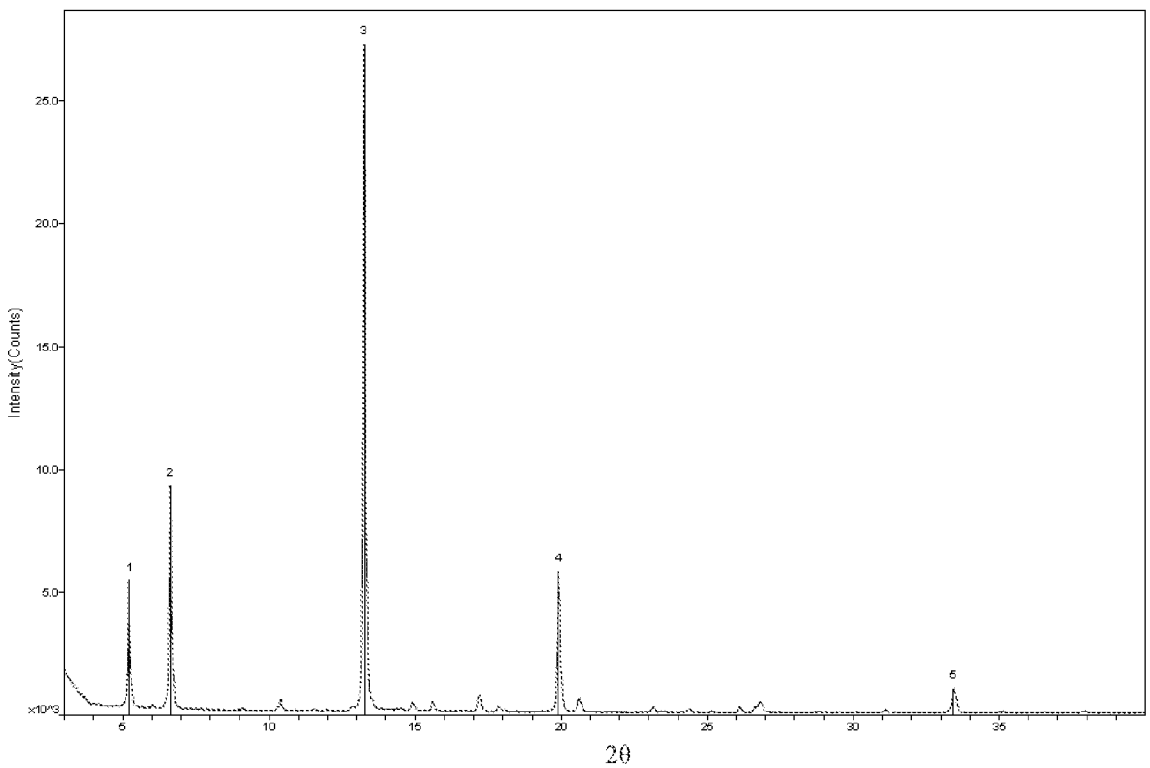
FIG. 5 shows XRPD of the crystal form I.

The XRPD of Crystal Form I was shown in FIG. 5; the DSC of Crystal Form I was shown in FIG. 6; the TGA of Crystal Form I was shown in FIG. 7.

Example 6: Crystal Form II of Compound I

About 200 mg of Compound I-A (Crystal Form VIII) was weighed into a 40 mL glass vial and 10 mL acetone/water (9/1, v/v) was added. The resulting suspension was stirred at 50° C. and the solid sample at different time points was examined by XPRD after dried at 40° C. overnight.

Based on the data of XRPD, the Crystal Form II obtained by the above method was needle crystal and could be a hydrate from the DSC and TGA data which showed an endothermic peak at 220° C. The 220° C. may be the transformation temperature of the crystal form and the final melting point is about 280° C. XRPD and DVS data also revealed Crystal Form II has a similar crystal structure with Crystal Form VIII as well as moisture absorption/desorption process, and is identified as being hygroscopic.

Figure 8:
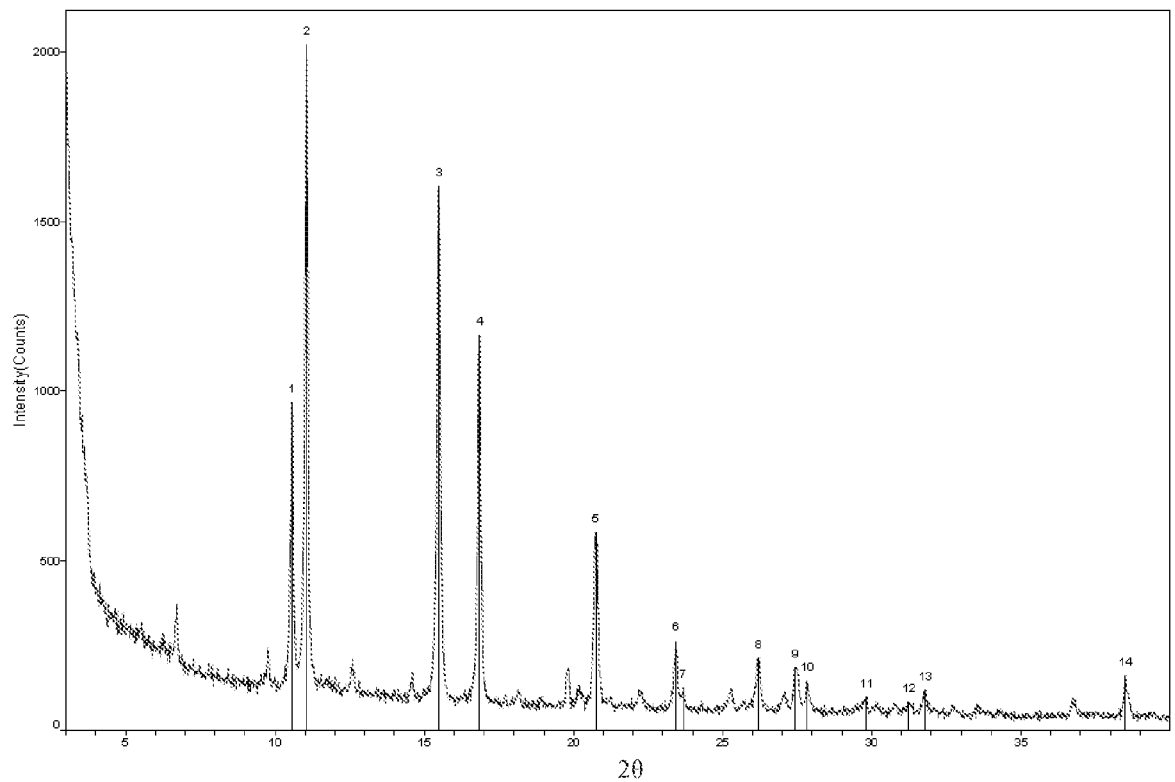
FIG. 8 shows XRPD of the crystal form II.

The XRPD of Crystal Form II was shown in FIG. 8; the DSC of Crystal Form II was shown in FIG. 9; the TGA of Crystal Form II was shown in FIG. 10; and the DVS of Crystal Form II was shown in FIG. 11.

Example 7: Crystal Form III of Compound I

About 10 mg of Compound I (Crystal Form I) was transferred to a 1.5 mL vial and 1.5 mL EtOH was added. The resulting suspension was shaken at 25° C. and then the solid sample was taken out at different time points and examined by XPRD after dried under vacuum at 40° C. overnight.

The thermal analysis showed that the Crystal Form III is an anhydrate with a melting point of 280° C.

Figure 12:
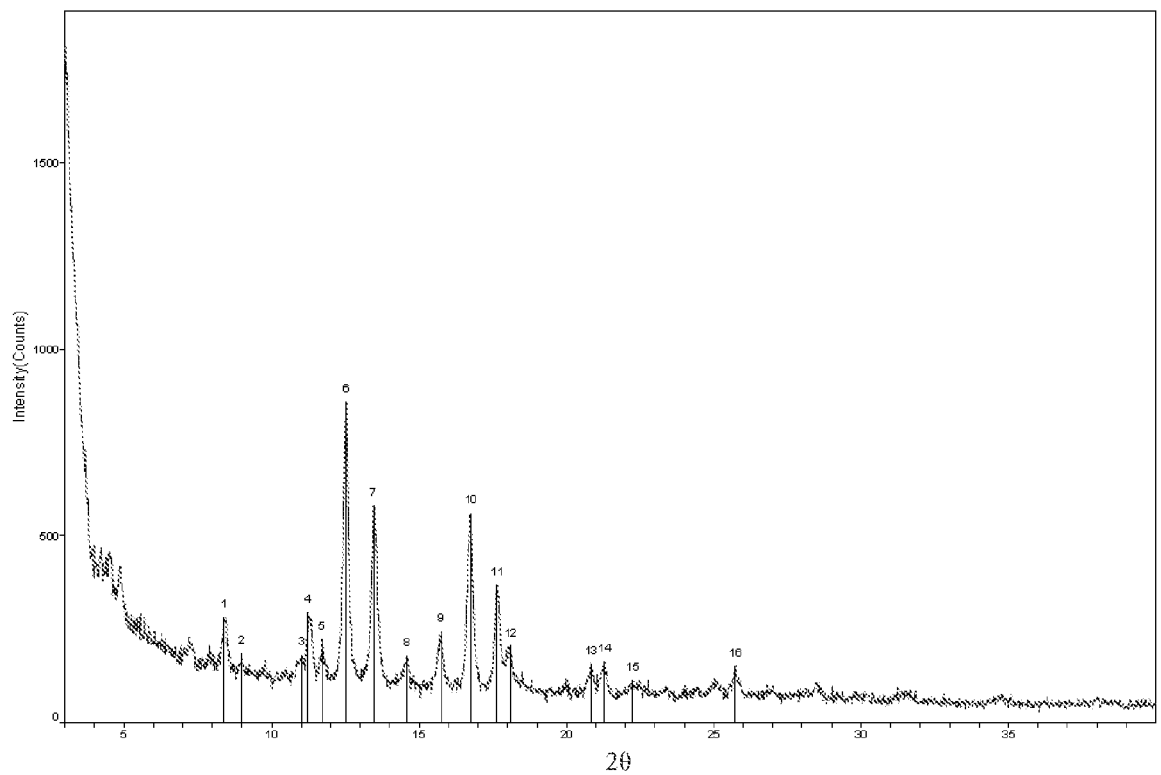
FIG. 12 shows XRPD of the crystal form III.

The XRPD of Crystal Form III was shown in FIG. 12; The DSC of Form III was shown in FIG. 13; The TGA of Form III was shown in FIG. 14.

Example 8: Crystal Form V of Compound I

To a 40 mL glass vial was added 200 mg of Compound I-A (Crystal Form VIII) and 10 mL MeOH and the resulting suspension was stirred at 50° C. The solid was sampled at different time points and examined by XRPD after dried at 40° C. by vacuum.

The XRPD data showed Crystal Form VIII transformed to Crystal Form VI after slurrying at 50° C. for 1 day then to Crystal Form V after slurrying at 50° C. for 5 days. It can be inferred that at 50° C., Crystal Form VI tends to transform into Form V but with different transformation rates in different solvents. Based on the data of DSC and TGA, Crystal Form V was in an anhydrate form with a melting point of 270° C. DVS also revealed that the mass increased about 0.8% under the relative humidity condition ranged from 0% to 80% which was identified as slight hygroscopic. Meanwhile, no significant change happened to the crystal form after the DVS testing.

Figure 15:
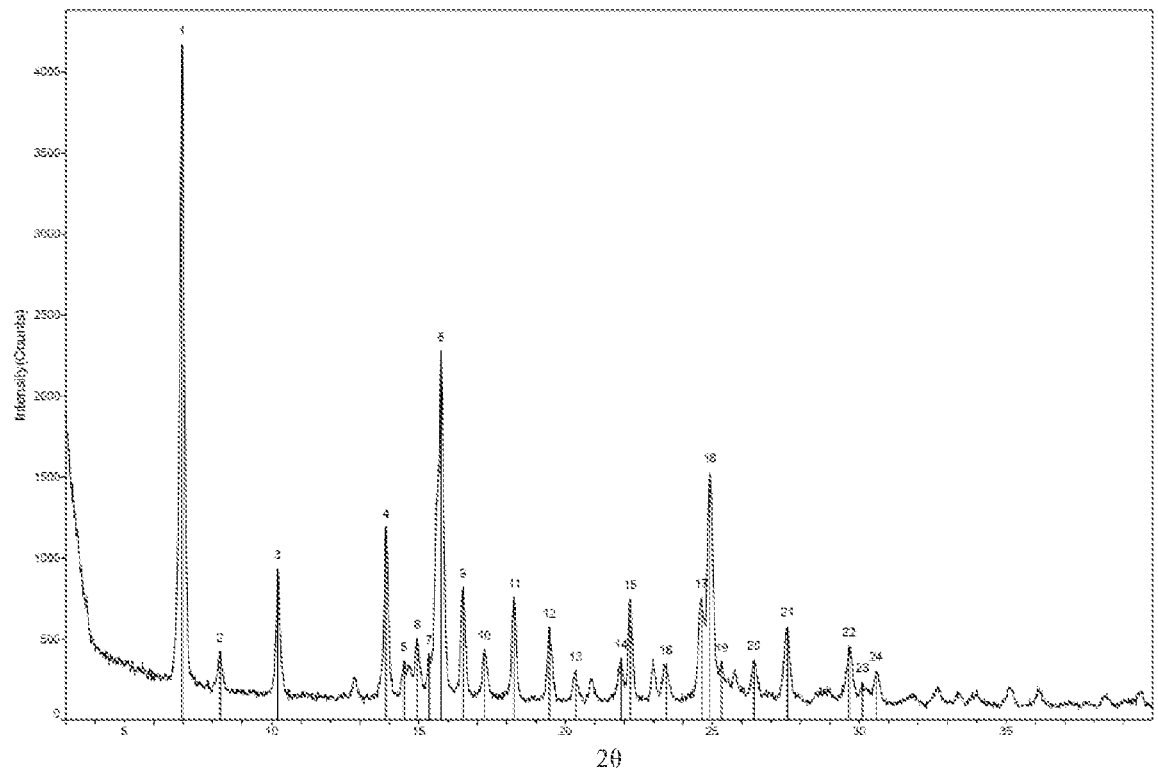
FIG. 15 shows XRPD of the crystal form V.

The XRPD of Crystal Form V was shown in FIG. 15; The DSC of Crystal Form V was shown in FIG. 16; The TGA of Crystal Form V was shown in FIG. 17; The DVS of Crystal Form V was shown in FIG. 18.

Example 9: Form VI of Compound I

To the 40 mL glass vial was added 200 mg of Compound I-A (Crystal Form VIII) and 10 mL EtOH and the resulting suspension was shaken at 50° C. for 5 days and stirred for 1 day. The solid was sampled at different time points and examined by XRDP after dried at 40° C. by vacuum.

Based on the data of DSC and TGA, Crystal Form VI was in an anhydrate form with a melting point of 280° C. DVS also revealed that the mass increased about 0.5% under the relative humidity condition ranged from 0% to 80% which was identified as slight hygroscopic. Meanwhile, no significant change happened to the crystal form after the DVS testing.

Figure 19:
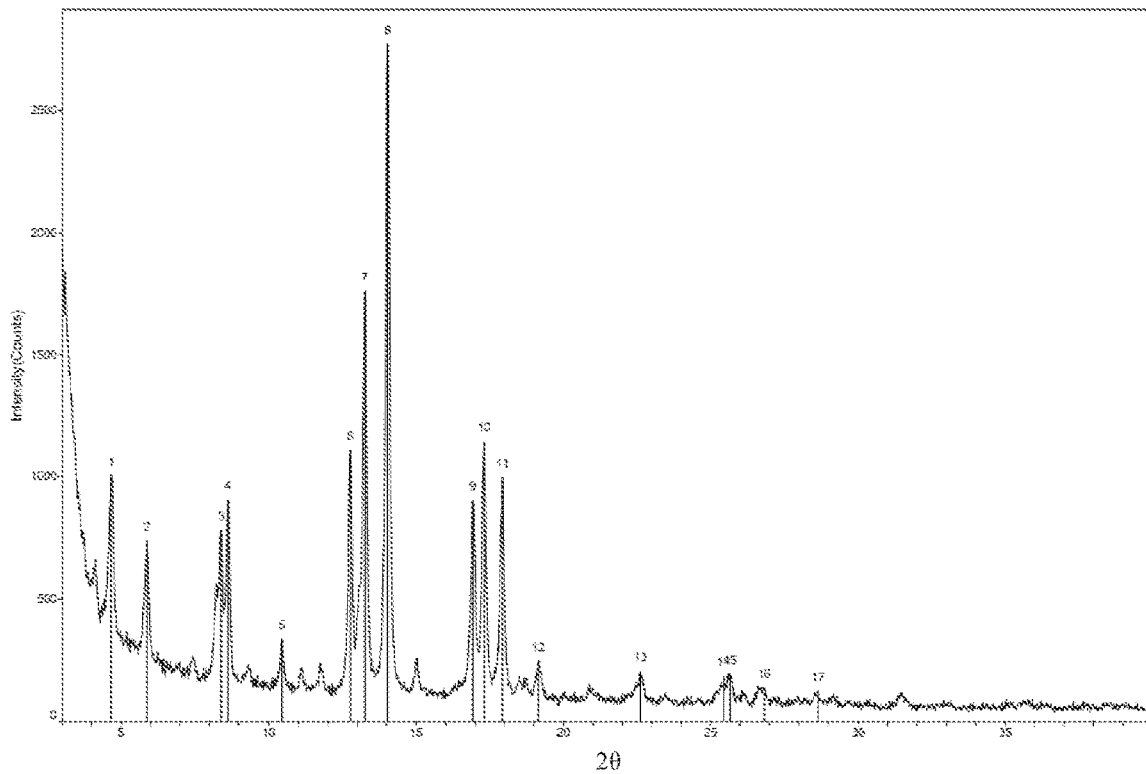
FIG. 19 shows XRPD of the crystal form VI.

The XRPD of Crystal Form VI was shown in FIG. 19; the DSC of Crystal Form VI was shown in FIG. 20; the TGA of Crystal Form VI was shown in FIG. 21; and the DVS of Crystal Form VI was shown in FIG. 22.

Example 10: Crystal Form IX of Compound I

About 10 mg of Compound I-A (Crystal Form VIII) was added into 8 mL glass vial, covered by pin-hole aluminum foil. The vial was placed to a 40 mL glass vial with 4 mL EtOH. The 40 mL glass vial was capped by a lip having a pad and placed for one month. Then the solid sample was taken out and examined by XRPD which showed that Crystal Form IX obtained in EtOH was an anhydrate.

Replacing EtOH with EtOAc gave the mixture of Crystal Form I and Crystal Form II while DCM gave the mixture of Crystal Form I and Crystal Form XI.

Figure 23:
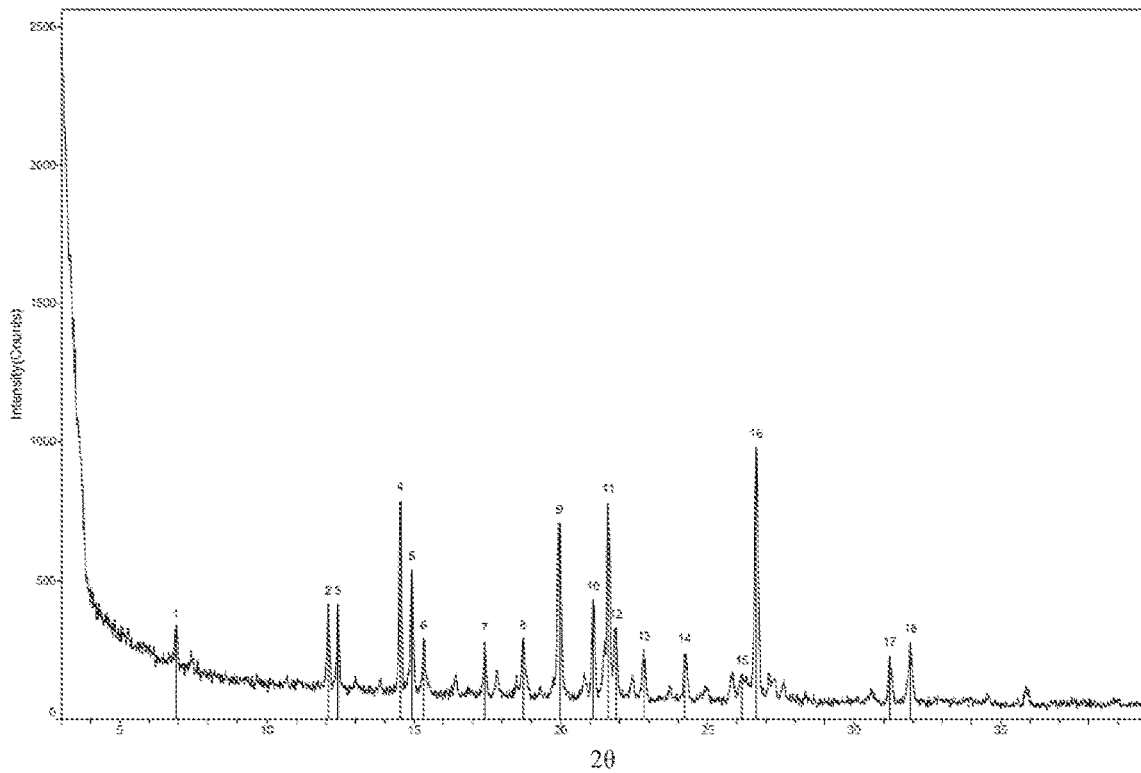
FIG. 23 shows XRPD of the crystal form IX.

The XRPD of Crystal Form IX was shown in FIG. 23; the DSC of Crystal Form IX was shown in FIG. 24; and the TGA of Crystal Form IX was shown in FIG. 25.

Example 11: Crystal Form X of Compound I

About 100 mg of Compound I-A (Crystal Form VIII) was dissolved in 5 mL EtOH at 60° C. After filtration by a needle filter, the filtrate was transferred to 40 mL glass vial and put into the −20° C. refrigerator for overnight. The solid was examined by XRPD after collected and dried at 40° C. by vacuum overnight.

The data showed that it was Crystal Form X, having a similar thermal behavior to Crystal Form I in term of TGA and DSC data, from which it was inferred as a hydrate. The crystal form changed at 170° C. and the final melting point was 280° C.

Figure 26:
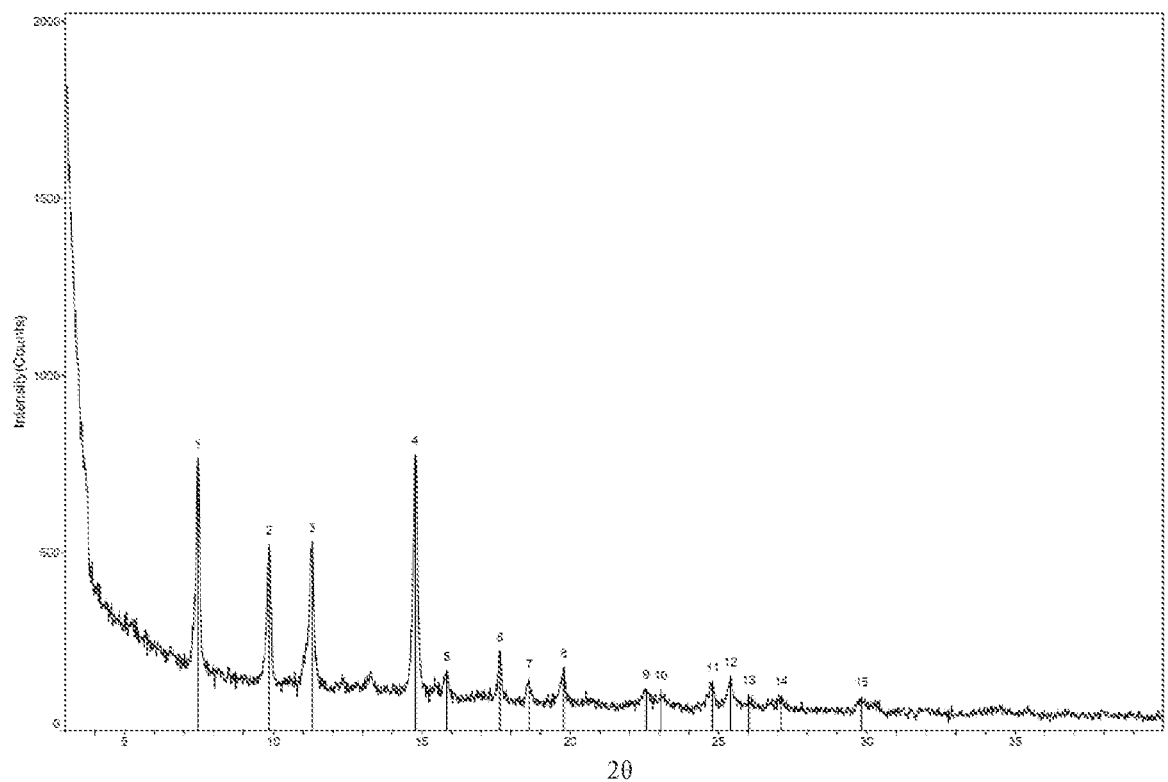
FIG. 26 shows XRPD of the crystal form X.

The XRPD of Crystal Form X was shown in FIG. 26; the DSC of Crystal Form X was shown in FIG. 27; and the TGA of Crystal Form X was shown in FIG. 28.

Example 12: Crystal Form XI of Compound I

About 100 mg of Compound I-A (Crystal Form VIII) was dissolved in 5 mL MeOH at 60° C. After filtration by a needle filter, the filtrate was transferred to 40 mL glass vial and put into the −20° C. refrigerator for overnight. The resulting solid was examined by XRPD after collected and dried at 40° C. by vacuum overnight.

The data showed it was Crystal Form XI and was similar with Form I in term of TGA and DSC data from which it was referred as hydrate. The crystal form changed at 170° C., and the final melting point was 280° C.

Replacing MeOH with acetonitrile or acetone gave the mixture of Crystal Form I and Crystal Form XI.

Figure 29:
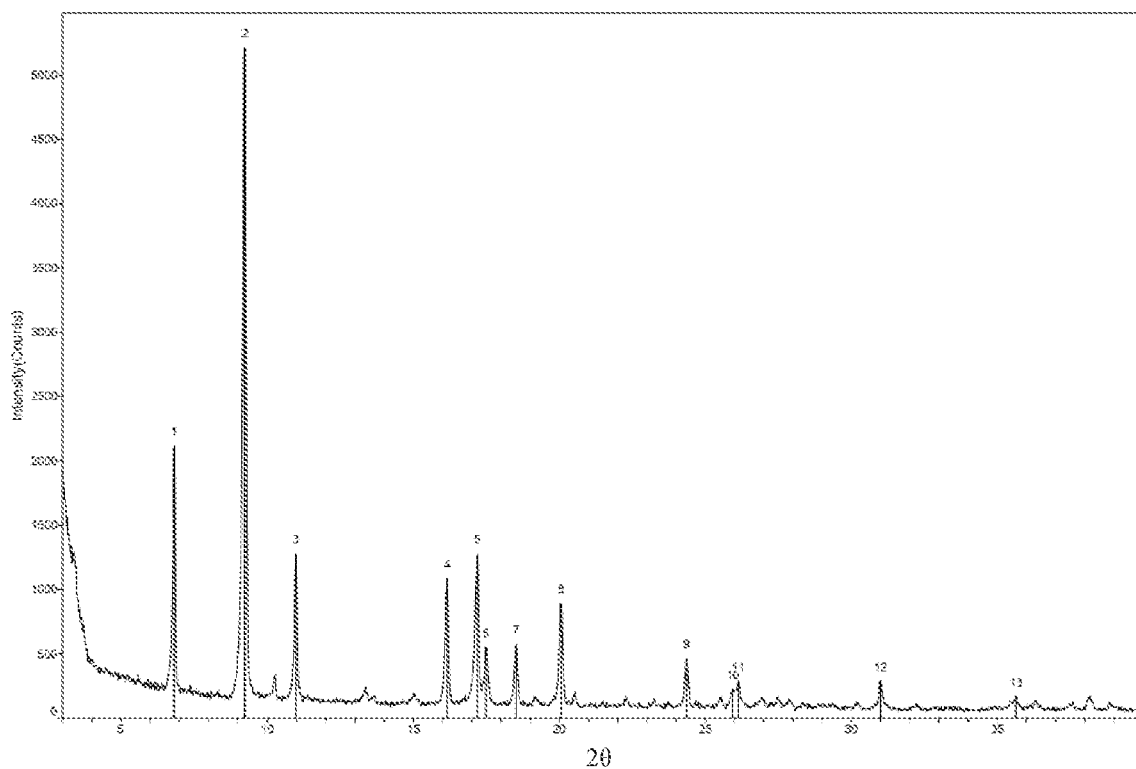
FIG. 29 shows XRPD of the crystal form XI.

The XRPD of Crystal Form XI was shown in FIG. 29; the DSC of Crystal Form XI was shown in FIG. 30; and the TGA of Crystal Form XI was shown in FIG. 31.

Example 13: Crystal Form "VIII'" of Compound I

Crystal Form "VIII'" was the crystal form of Crystal Form VIII at 30% RH and can return to Crystal Form VIII by moisture absorption after dehydrating with heat, 5° C./75% RH, ambient temperature /75% RH or 40° C./75% RH.

Figure 32:
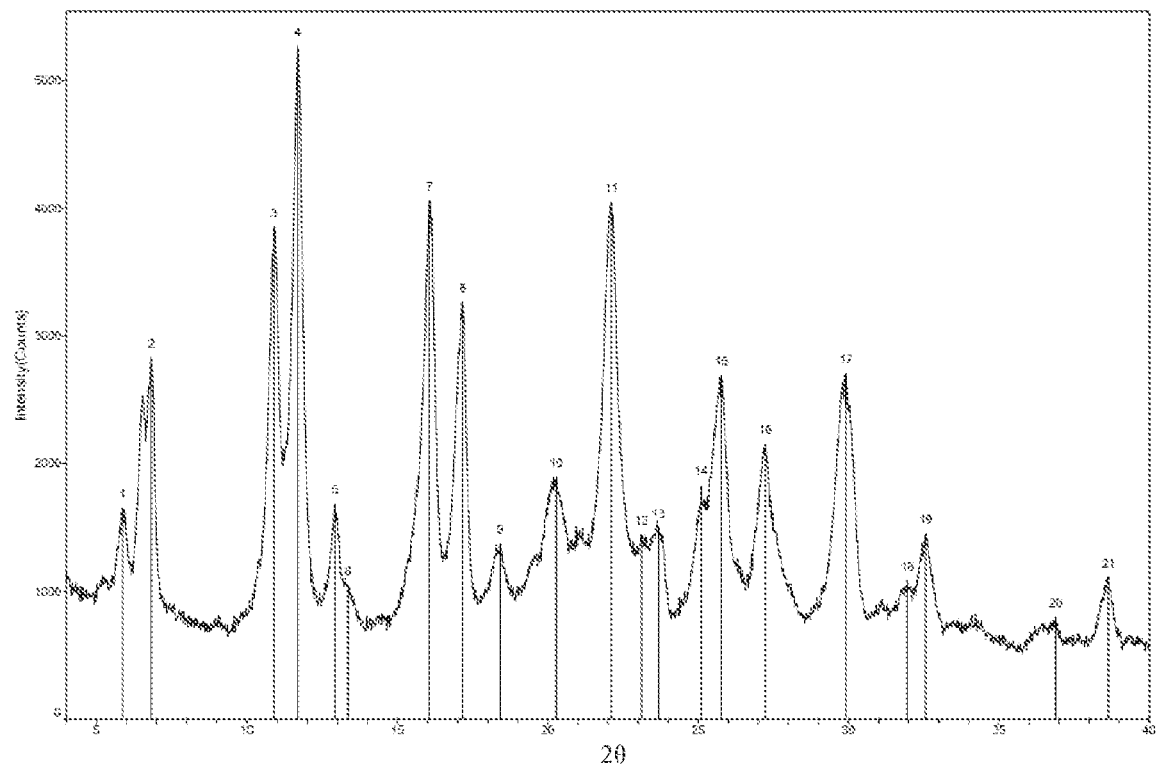
FIG. 32 shows XRPD of the crystal form "VIII".

The XRPD of Crystal Form "VIII'" was shown in FIG. 32.

EXAMPLE III: STUDY ON THE THERMODYNAMIC STABILITY AND SOLVENTS COMPETITION AMONG DIFFERENT CRYSTAL FORMS

Example 14

With different solvents at corresponding temperatures showed in the table below, Crystal Form VIII was dissolved until saturated respectively. After filtration by a needle filter, the filtrate was transferred to 1.5 mL vial. To the vial was added 5 mg of Crystal Form V and VI and the resulting suspensions were shaken for a while at the target temperatures. After centrifugation, the obtained solid was dried at 40° C. by vacuum overnight and then examined by XRPD to identify changes among different crystal forms.

The data of XRPD revealed that in the anhydrous solvents, the dominant crystal form was Crystal Form V which was more stable than Crystal Form VI at 25° C., 50° C. and 80° C. respectively. However, both Crystal Form V and Crystal Form VI changed to Crystal Form II in the hydrous solvents.

With different solvents at corresponding temperatures shown in the table below, Crystal Form VIII was dissolved until saturated respectively. After filtration by a needle filter, the filtrate was transferred to 1.5 mL vial. To the vial was added 5 mg of Crystal Form III, V and IX and the resulting suspensions were shaken for a while at the target temperatures. After centrifugation, the obtained solid was dried at 40° C. by vacuum overnight and then examined by XRPD to identify changes among different crystal forms.

Data obtained in two rounds of solvent competition testing revealed that in anhydrous solvents at a temperature below 50° C., the anhydrate Crystal Form V was dominant and other anhydrate Crystal Forms III, VI and IX were all anhydrate metastable crystal forms.

| Solvent | Temp. (° C.) | Crystal Form (V + VI) 1 day | Crystal Form (III + V + IX) 3 h |
|---|---|---|---|
| EtOH | 25 | V | V |
|  | 50 | V | V |
| Acetone | 25 | V | V |
|  | 50 | V | V |
| MeOH/H$_2$O (1:1 v/v) | 25 | II | — |
|  | 50 | II | — |
| IPAc | 80 | V | — |

Example 15: Water activity study

Crystal Form VIII was dissolved in solvents with different water activity shown in the table below and then filtered by a needle filter to prepare a saturated solution. After the filtrate was transferred into a 1.5 mL vial, 2 mg of Crystal Form I, II, VIII, X and XI were added respectively and the resulting suspensions were shaken for a while at the target temperatures. After centrifugation, the solid obtained was air dried at ambient temperature (DMSO system was washed by MTBE) and then examined by XRPD to identify changes among different crystal forms.

The results revealed that in the water activity solutions, all hydrate crystal forms transformed to Form II in one day, but in DMSO the crystal form is Crystal Form VIII.

Since Crystal Form II was dominant in the water activity solutions, the anhydrate Crystal Form V was used to study the relationship among the crystal forms. The results revealed Crystal Form II changed to Crystal Form V in a low water activity (Aw<0.3) and Crystal Form V changed to Crystal Form II in a high water activity (Aw>0.3). Besides, it was basically confirmed that Crystal Form V was dominant in pure organic solvents.

| Crystal Form | Water activity solution | Temp. (° C.) | Crystal Form 1 day |
|---|---|---|---|
| I + II + VIII + X + XI | Aw 0.126 (IPA solution) | 50 | II |
|  | Aw 0.319 (IPA solution) |  | II |
|  | Aw 0.592 (IPA solution) |  | II |
|  | Aw 0.899 (IPA solution) |  | II |
|  | Aw 0.287 (EtOH solution) |  | II |
|  | Aw 0.706 (EtOH solution) |  | II |
|  | Aw 0.904 (EtOH solution) |  | II |
|  | DMSO:H$_2$O = 1:1 |  | VIII |
| II + V | Aw 0.126 (IPA solution) |  | V |
|  | Aw 0.319 (IPA solution) |  | V |
|  | Aw 0.592 (IPA solution) |  | II |
|  | Aw 0.899 (IPA solution) |  | II |
|  | Aw 0.287 (EtOH solution) |  | V |
|  | Aw 0.706 (EtOH solution) |  | II |
|  | Aw 0.904 (EtOH solution) |  | II |

EXAMPLE IV: PHYSICAL STABILITY STUDY

About 10 mg of Crystal Forms II, V and VI were added into 1.5 mL vial respectively which were then placed at the conditions of 25° C./60% RH and 40° C./75% RH. The solid in the vials was examined by XRPD at the corresponding time points.

Results are shown in the below table, indicating that Crystal Forms II, V and VI were not changed at different testing conditions within two weeks.

| | Physical stability | | | |
|---|---|---|---|---|
| | 25° C./60% RH | | 40° C./75% RH | |
| Crystal form | 7 days | 14 days | 7 days | 14 days |
| Crystal Form V | V | V | V | V |
| Crystal Form VI | VI | VI | VI | VI |
| Crystal Form II | II | II | II | II |

A long-term stability study has been carried out under condition of 25° C./60% RH for the crystal form VIII. Results shown below indicate that Crystal Form VIII is stable at the long-term condition at the corresponding time points of 24 months, including no crystal form change and no significant change of water content.

| | Stability condition (25 ± 2° C./60 ± 5% RH) | | | | |
|---|---|---|---|---|---|
| Items | Initial | 9 months | 12 months | 18 months | 24 months |
| XRPD | Form VIII | / | Form VIII | / | Form VIII |
| Water content | 7.7% | 7.8% | 7.7% | 7.6% | 7.4% |

EXAMPLE V: RELATIVE HUMIDITY X-RAY POWDER DIFFRACTION OF CRYSTAL FORM VIII

Based on the above data, Crystal Form VIII was most likely to be a hydrate. But it was difficult to characterize its dehydrated XRPD as it is a compound with high hygroscopicity, revealing that Crystal Form III may most likely be a channel hydrate. Therefore, Crystal Form VIII was further characterized by RH-XRPD to confirm the hydrate crystal Form and to have the knowledge of the crystal Form transformation with the different RH.

The parameters of XRPD used in the test were as follows:
Tube: Cu/K-Alpha ($\lambda$=1.54179Å);
Generator: Voltage: 40 KV; Current: 40 mA;
Scan Scope: 3-40 deg;
Scan Speed: 10 deg/min.

About 100 mg of compound was evenly distributed to form a layer in a sample holder and transferred to a RH control component in which the relative humidity was controlled and adjusted by the ratio of dry/wet N$_2$ blown. Details of the humidity and equilibrium time were shown in the following table.

| Absorption process of Crystal Form VIII | | | Desorption process of Crystal Form VIII | | |
|---|---|---|---|---|---|
| Relative humidity (% RH) | Equilibrium Time (hour) | Crystal Form | Relative humidity (% RH) | Equilibrium Time (hour) | Crytal Form |
| 0 | 2 | XII | 90 | 0.5 | VIII |
| 10 | 2 | XII | 80 | 0.5 | VIII |
| 20 | 2 | XII | 70 | 0.5 | VIII |
| 30 | 2 | "VIII" | 60 | 0.5 | VIII |
| 40 | 2 | VIII | 50 | 2 | VIII |
| 50 | 2 | VIII | 40 | 2 | VIII |
| 60 | 0.5 | VIII | 30 | 2 | VIII |

| Absorption process of Crystal Form VIII | | | Desorption process of Crystal Form VIII | | |
|---|---|---|---|---|---|
| Relative humidity (% RH) | Equilibrium Time (hour) | Crystal Form | Relative humidity (% RH) | Equilibrium Time (hour) | Crytal Form |
| 70 | 0.5 | VIII | 20 | 2 | XII |
| 80 | 0.5 | VIII | 10 | 2 | XII |
| 90 | 0.5 | VIII | 0 | 2 | XII |

The data above revealed that Crystal Form XII was the dehydrated crystal Form of Form VIII at 0% RH (named Crystal Form XII) while Crystal Form "VIII" was the crystal form of Crystal Form VIII at 30% RH that could return to Crystal Form VIII in the specific conditions such as 5° C./75% RH, ambient temperature/75% RH, or 40° C./75% RH. In the absorption process from 0% RH to 40% RH, Crystal Form VII would transform to hydrated Crystal Form VIII slowly which kept steady when RH was >40%. A slight hysteresis of desorption process was observed which was consistent with the DVS data showing the crystal form turned into Crystal Form XII after complete dehydration when the relative humidity ranged from 30% to 0%. The data of RH-XRPD, which matched the DVS data as well as its inference, together with the observation of crystal form changing after dehydration, proved that Crystal Form VIII was a hydrate including two water molecules, which was stable at no less than 40% RH, otherwise the water would loss and the crystal form would change.

Details of calculation equation:

$$\frac{\text{The weight change of stable crystal form in the lowest humidity \%}}{100\%} \times \frac{\text{The molecular weight of compound}}{\text{Water molecular weight}} = \text{The number of crystal water}$$

EXAMPLE VI: CRYSTAL STRUCTURE ELUCIDATION BY MICROCRYSTAL ELECTRON DIFFRACTION

Due to the difficulty of obtaining the proper single crystal to do X-ray diffraction for the structure analysis, the technology of microcrystal electron diffraction, capable of application for the much-smaller-size single crystal, was chosen to do the single crystal analysis to further identify the hydrate structure and crystal water of Crystal Form VIII of Compound I-A.

The testing method and procedure were as follows:
1. The sample grid was immersed into the liquid nitrogen until the temperature was steady.
2. The crystal powder of Crystal Form VIII was put into a PE tube to which a clean copper grid was put to make the Crystal Form VIII solid absorbed on the copper grid.
3. The copper grid was cooled in the liquid nitrogen quickly to lock the crystal water.
4. The copper grid was immersed in the liquid nitrogen and placed to the sample grid, which was then transferred to the cryo-TEM holder to run the test.

Figure 35:
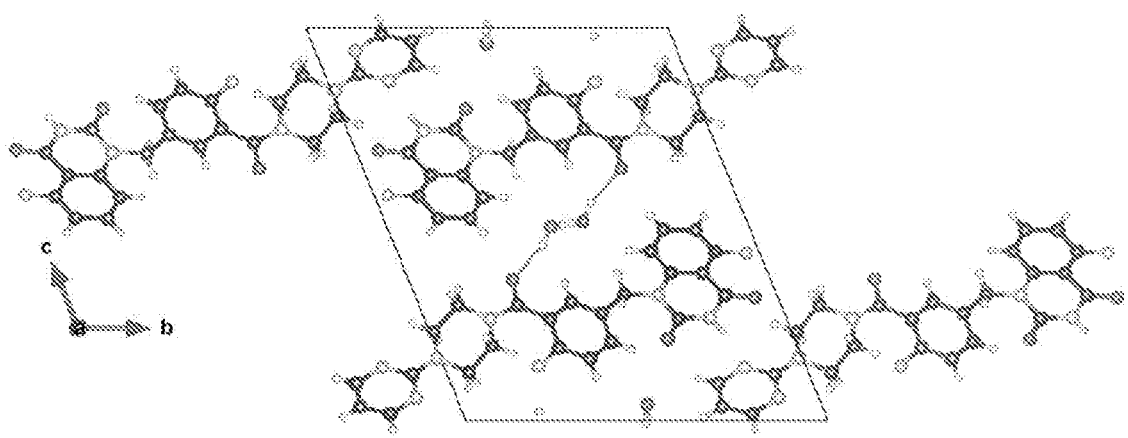
FIG. 35 shows the hydrate crystal structure model diagram projected from a axis direction for crystal form VIII.

The diffraction data from MicroED technology of the sample was collected, analyzed and refined. The asymmetric unit of the monocrystal structure of Crystal Form VIII of Compound I-A was shown in FIG. 34; the hydrate crystal structure model diagram projected from an axis direction was shown in FIG. 35. The results showed the asymmetric unit of Crystal Form VIII of Compound I-A comprised one molecule of 5-fluoro-1-(4-fluoro-3-(4-(pyrimidin-2-yl) piperazine-1-carbonyl)benzyl) quinazoline-2,4(1H,3H)-dione and two molecules of water. There is a cavity between the two molecules of 5-fluoro-1-(4-fluoro-3-(4-(pyrimidin-2-yl) piperazine-1-carbonyl)benzyl)quinazoline-2,4(1H,3H)-di-one, binding the water molecular by hydrogen bonds.

The crystal structure analysis confirmed the Crystal Form VIII structure of Compound I-A, revealing the dihydrate crystal form with 1:2 ratio of 5-fluoro-1-(4-fluoro-3-(4-(pyrimidin-2-yl)piperazine-1-carbonyl)benzyl)quinazoline-2,4(1H,3H)-dione and water.

What is claimed is:

1. A crystal form of 5-fluoro-1-(4-fluoro-3-(4-(pyrimidin-2-yl)piperazine-1-carbonyl)benzyl)quinazoline-2,4(1H,3H)-dione selected from crystal forms VIII, I, II, III, V, VI, "VIII", IX, X, XI, XII, or a mixture of two or more of the above crystal forms;
   wherein, the XRPD of the crystal form VIII includes diffraction peaks at 2θ=6.7°±0.2°, 11.0°±0.2°, 22.2°±0.2° and 25.7°±0.2°;
   the XRPD of the crystal form I includes diffraction peaks at 2θ=5.2°±0.2°, 6.6°±0.2°, 13.3°±0.2° and 19.9°±0.2°;
   the XRPD of the crystal form II includes diffraction peaks at 2θ=10.6°±0.2°, 11.0°±0.2°, 15.5°±0.2° and 16.8°±0.2°;
   the XRPD of the crystal form III includes diffraction peaks at 2θ=12.5°±0.2°, 13.5°±0.2°, 16.7°±0.2°, and 17.6°±0.2°;
   the XRPD of the crystal form V includes diffraction peaks at 2θ=7.0°±0.2°, 13.9°±0.2°, 15.8°±0.2° and 24.9°±0.2°;
   the XRPD of the crystal form VI includes diffraction peaks at 2θ=12.8°±0.2°, 13.3°±0.2°, 14.0°±0.2° and 17.3°±0.2°;
   the XRPD of the crystal form "VIII" includes diffraction peaks at 2θ=6.8°±0.2°, 10.9°±0.2°, 11.7°±0.2°, 16.1°±0.2°, 17.2°±0.2°, 22.1°±0.2°, 25.8°±0.2°, 27.2°±0.2° and 30.0°±0.2°;
   the XRPD of the crystal form IX includes diffraction peaking at 2θ=14.5°±0.2°, 20.0°±0.2°, 21.6°±0.2° and 26.7°±0.2°;
   the XRPD of the crystal form X includes diffraction peaks at 2θ=7.5°±0.2°, 9.8°±0.2°, 11.3°±0.2° and 14.8°±0.2°;
   the XRPD of the crystal form XI includes diffraction peaks at 2θ=6.8°±0.2°, 9.2°±0.2°, 11.0°±0.2° and 17.2°±0.2°; and
   the crystal form XII is the dehydrated form of the crystal form VIII.

2. The crystal form of 5-fluoro-1-(4-fluoro-3-(4-(pyrimidin -2-yl)piperazine-1-carbonyl)benzyl)quinazoline-2,4(1H, 3H)-dione according to claim 1, wherein the XRPD of the crystal form VIII further includes a diffraction peak at 2θ=27.0°±0.2°.

3. The crystal form of 5-fluoro-1-(4-fluoro-3-(4-(pyrimidin -2-yl)piperazine-1-carbonyl)benzyl)quinazoline-2,4(1H, 3H)-dione according to claim 1, wherein the XRPD of the crystal form VIII further includes (a) any one, any two, any three or more than three, or all of diffraction peaks at positions of 10.5°±0.2°, 15.5°±0.2°, 16.7°±0.2°, 18.9°±0.2°, 20.7°±0.2°, 23.3°±0.2° and 29.7°±0.2°; or (b) any one, any two, any three or more than three, or all of diffraction peaks at positions of 11.7°±0.2°, 16.1°±0.2°, 17.2°±0.2° and 30.0°±0.2°.

4. A crystal form of 5-fluoro-1-(4-fluoro-3-(4-(pyrimidin-2-yl)piperazine-1-carbonyl)benzyl)quinazoline-2,4(1H,3H)-dione, wherein the crystal form is form VIII, and its XRPD includes diffraction peaks in 2θ=6.7°±0.2°, 10.5°±0.2°, 11.0°±0.2°, 15.5°±0.2°, 16.7°±0.2°, 18.9°±0.2°, 20.7°±0.2°, 22.2°±0.2°, 23.3°±0.2°, 25.7°±0.2°, 27.0°±0.2° and 29.7°±0.2°.

5. The crystal form of 5-fluoro-1-(4-fluoro-3-(4-(pyrimidin-2-yl)piperazine-1-carbonyl)benzyl)quinazoline-2,4(1H,3H)-dione according to claim 4, wherein the crystal form VIII is a dihydrate, and/or the KF value of the crystal form VIII is 6%-10%.

6. A method of preparing 5-fluoro-1-(4-fluoro-3-(4-(pyrimidin-2-yl) piperazine-1-carbonyl)benzyl)quinazoline-2,4(1H,3H)-dione represented by Formula I, wherein the method includes:

(1) preparing a compound of Formula III from a compound of Formula IV and a compound of Formula V:

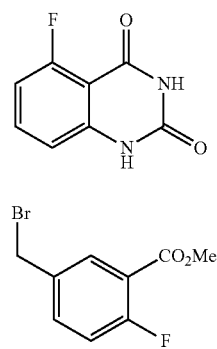

(2) hydrolyzing the compound of Formula III to obtain a compound of Formula II:

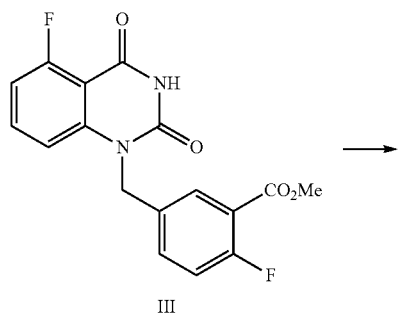

-continued

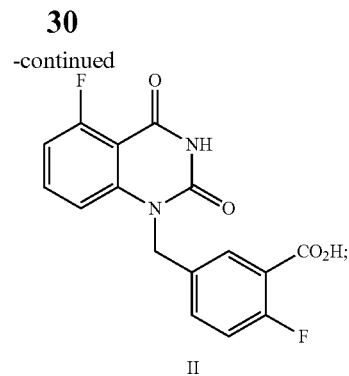

(3) preparing 5-fluoro-1-(4-fluoro-3-(4-(pyrimidin-2-yl) piperazine-1-carbonyl)benzyl) quinazoline-2,4(1H,3H)-dione represented by Formula I via a condensation reaction between the compound of Formula II and a compound of Formula A:

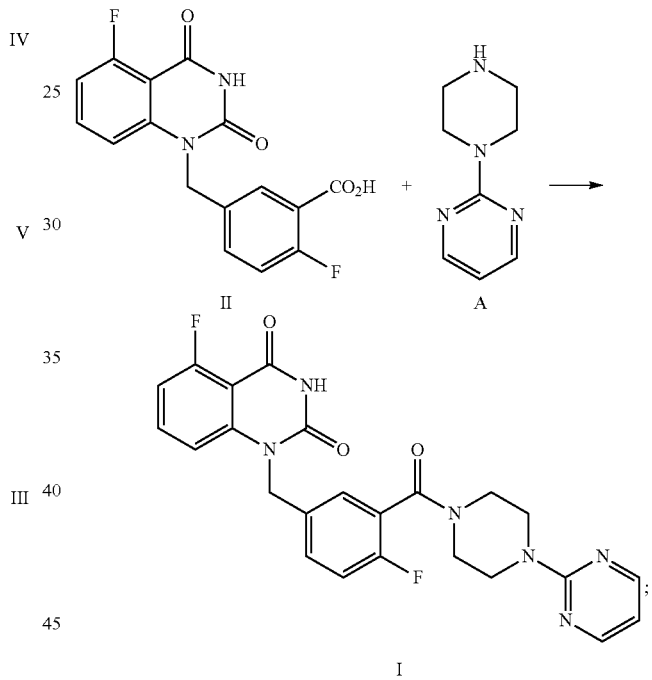

wherein in step (3), the compound of Formula II is dissolved in ethyl acetate, the temperature of a reactor is controlled at 15-25° C., and an ethyl acetate solution of the compound of Formula II is added to the reactor; then the temperature of the reactor is adjusted to 20±2° C. and a condensation agent and an organic base are added, and then the reaction mixture is heated to 35-45° C.; a solution of Compound A in ethyl acetate is added and stirred for 15-25 hours; after the completion of reaction, process water is added to the reaction mixture, stirred for 1-3 hours, and filtered; the filter cake is rinsed with ethyl acetate, the wet product is returned to the reactor, dimethyl sulfoxide is added and stirred for 1-3 hours, then purified water and crystal seeds of the compound of Formula I are added and stirred for 4-6 hours and filtered; the filter cake is rinsed with process water, and dried under reduced pressure at 50-60° C. for 50-70 hours to give 5-fluoro-1-(4-fluoro-3-(4-(pyrimidin-2-yl)piperazine -1-carbonyl)benzyl)quinazo-line-2,4(1H,3H)-dione (Formula I).

7. The crystal form of 5-fluoro-1-(4-fluoro-3-(4-(pyrimidin-2-yl) piperazine-1-carbonyl)benzyl)quinazoline -2,4 (1H,3H)-dione according to claim 1, wherein:
the XRPD of the crystal form II further includes the diffraction peak at 2θ=20.8°±0.2°;
the XRPD of the crystal form III further includes any one, two or all three of diffraction peak at 2θ=8.4°±0.2°, 11.2°±0.2° and 15.8°±0.2°;
the XRPD of the crystal form VI further includes any one, two, three, or all four of diffraction peaks at 2θ=4.7°±0.2°, 8.6°±0.2°, 16.9°±0.2°, and 17.9°±0.2°, or additionally further includes a diffraction peak at 2θ=8.4°±0.2°;
the XRPD of the crystal form IX further includes any one, any two, any three, or all four of diffraction peaks at 2θ=12.1°±0.2°, 12.4°±0.2°, 14.9°±0.2°, and 21.1°±0.2°, or additionally further includes any one, any two, any three, any four or all five of diffraction peaks at 15.3°±0.2°, 17.4°±0.2°, 18.7°±0.2°, 21.9°±0.2° and 31.9°±0.2°; and
the XRPD of the crystal form X further includes the diffraction peak at 2θ=17.6°±0.2°.

8. A method for treating or preventing clinical conditions responsive to the inhibition of PARP activity comprising administering to a subject in need thereof a medicament manufactured from any of the crystal forms of 5-fluoro-1-(4-fluoro-3-(4-(pyrimidin-2-yl) piperazine -1-carbonyl)benzyl)quinazoline-2,4(1H,3H)-dione according to claim 1; wherein the clinical conditions responsive to the inhibition of PARP activity include cancers, stroke and neurodegenerative diseases.

9. The method according to claim 8, wherein the cancer is selected from the group consisting of liver cancer, melanoma, Hodgkin's disease, non-Hodgkin's lymphoma, acute lymphoid leukemia, chronic lymphoid leukemia, multiple myeloma, neuroblastoma, breast cancer, ovarian cancer, lung cancer, Wilms tumor, cervical cancer, testicular cancer, soft tissue sarcoma, primary macroglobulinemia, bladder cancer, chronic myeloid leukemia, primary brain cancer, malignant melanoma, small cell lung cancer, gastric cancer, colon cancer, malignant pancreatic islet tumor, malignant carcinoid cancer, choriocarcinoma, granuloma fungoides, head and neck cancer, osteogenic sarcoma, pancreatic cancer, acute granulocytic leukemia, hairy cell leukemia, rhabdomyosarcoma, Kaposi's sarcoma, genitourinary tumor disease, thyroid cancer, esophageal cancer, malignant hypercalcemia, cervical hyperplasia, renal cell carcinoma, endometrial cancer, polycythemia vera, idiopathic thrombocytosis, adrenal cortical cancer, skin cancer and prostate cancer.

10. The method according to claim 6, wherein:
in step (1):
(a) the compound of Formula IV and hexamethyldisilazane are reacted in an organic solvent under an acidic condition to prepare an organic solution of a compound of Formula IV-TMS, wherein the molar ratio of the compound of Formula IV to hexamethyldisilazane is between 1:1.5 and 1:3, the weight of the organic solvent used to dissolve the compound of Formula IV is 5 to 6.5 times that of the compound of Formula IV, the reaction temperature is 105-120° C. and the reaction time is 10-20 hours;

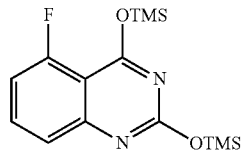

then (b) the compound of Formula V and the organic solution of the compound of Formula IV-TMS are mixed in the presence of an organic solvent for reaction to obtain a compound of Formula III; and/or
in step (2), the compound of Formula III is added to a mixture of an inorganic base in aqueous solution and a $C_1$-$C_4$ monoalcohol, the resulting mixture is stirred at 30-50° C. for 1-6 hours; after the reaction is completed, 2.5 to 4 times the weight of the compound of Formula III of water and 2 to 3 times that of methanol are added, and the pH of the reaction mixture is adjusted to 1.5-3 at the same temperature, then the reaction mixture is stirred and slowly cooled down to 20-30° C., and filtered after completion of stirring; the filter cake is rinsed and dried under reduced pressure to obtain the compound of Formula II; and/or
in step (3), the molar ratio of the condensation agent to the compound of Formula II is between 1:1 and 1:2.5; the molar ratio of the organic base to the compound of Formula II is 1:2 between 1:4; the molar ratio of the compound of Formula A to the compound of Formula II is between 2:1 and 0.8:1.

11. The method according to claim 10, wherein:
in step (a) of step (1), the compound of Formula IV is dissolved in toluene, hexamethyldisilazane is added, and then sulfuric acid is added dropwise; the mixed solution is stirred at 112-120° C. for 10- 20 hours until the solid is completely dissolved; the reaction mixture is cooled to 55-65° C., and then concentrated to obtain a toluene solution of the compound of Formula IV-TMS, wherein the molar ratio of the compound of Formula IV to sulfuric acid is between 12:1 and 8:1;
in step (b) of step (1), a sulfolane solution of the compound of Formula V is mixed with the organic solution of the compound of Formula IV-TMS for reaction, wherein the mixing is carried out at 35-45° C.; the reaction temperature is 95-105° C. and the reaction time is 10-30 hours; after the completion of reaction, methanol is slowly added while stirring for crystallization at 55-65° C.; then process water is slowly added while stirring at 20° C.; the mixture is centrifugated, and the filter cake is rinsed with methanol/water solution and then dried under reduced pressure for 10-30 hours to obtain the compound of Formula III; the amount of the compound Formula V used in step (b) is calculated based on the amount of the compound of Formula IV used in step (a), the molar ratio of the compound of Formula V to the compound of Formula IV is between 1:1 and 2:1;
in step (2), the molar ratio of the inorganic base to the compound of Formula III is 1.5:1 and 3.0:1; the weight of the organic solvent is about 0.8-1.3 times that of the compound of Formula III;
the weight of the water in the inorganic base aqueous solution is about 2.8 to 3.5 times that of the compound of Formula III.

12. The method according to claim 6, wherein in step (3), after the completion of reaction, 0.1 to 0.5 times the weight of the compound of Formula A of process water is added to the reaction product, then the mixture is stirred for 1-3 hours and then filtered, the filter cake is rinsed with ethyl acetate and the wet product is returned to the reactor; 15 to 25 times the weight of the compound of Formula A of dimethyl sulfoxide is added into the reactor and the mixture is stirred for 1-3 hours, then 1 to 5 times the weight of the compound of Formula A of process water and crystal seeds of the compound of Formula I are added and stirred and the filtered;

the filter cake is rinsed with 3 to 6 times the weight of the compound of Formula A of process water, dried under reduced pressure at 50-60° C. for 60-70 hours, and blown with wet nitrogen gas in the filter drier 18-22 hours to give the product with crystal form VIII.

13. The method according to claim 12, wherein:

the compound of Formula I and dimethyl sulfoxide are mixed in a first reactor, and stirred at 55-65° C. until the solution is clear, wherein the amount of dimethyl sulfoxide is 7-10 times the weight of the compound of Formula I;

purified water and dimethyl sulfoxide are added to a second reactor, the temperature of the second reactor is adjusted to 50±3° C. and then crystal seeds are added, wherein the amount of purified water is 12-20 times the weight of the compound of Formula I, the amount of dimethyl sulfoxide is 6-10 times the weight of the compound of Formula I, and the amount of crystal seed is 0.003 to 0.007 times the weight of the compound of Formula I;

the solution in the first reactor is slowly transferred to the second reactor, the mixture is stirred until the obtained crystal form is consistent with the crystal form of reference standard, then filtered, and the filter cake is rinsed with purified water until the residual dimethyl sulfoxide is ≤2000 ppm, dried under reduced pressure in the reactor until KF is ≤8.0%, and then blown with wet nitrogen gas until KF is 6.6-9.0% and the XRPD is consistent with the reference standard to give the crystal form VIII.

14. The method according to claim 10, wherein in step (b) of step (1), the organic solution of the compound of Formula IV-TMS without purification is directly mixed with the compound of Formula V for reaction.

15. A method for preparing a medicament, comprising step of mixing the crystal form or a mixture of the crystal forms according to claim 1 with a pharmaceutically acceptable carrier or excipient, and optionally a step of granulating or tableting.

16. The method according to claim 15, wherein the crystal form is form VIII having XRPD including diffraction peaks in $2\theta = 6.7°\pm0.2°$, $10.5°\pm0.2°$, $11.0°\pm0.2°$, $15.5°\pm0.2°$, $16.7°\pm0.2°$, $18.9°\pm0.2°$, $20.7°\pm0.2°$, $22.2°\pm0.2°$, $23.3°\pm0.2°$, $25.7°\pm0.2°$, $27.0°\pm0.2°$ and $29.7°\pm0.2°$.

* * * * *